(12) United States Patent
Matsuda

(10) Patent No.: US 8,606,014 B2
(45) Date of Patent: Dec. 10, 2013

(54) IMAGE PROCESSING APPARATUS, EXTRACTING FOREGROUND PIXELS FOR EXTRACTED CONTINUOUS VARIABLE DENSITY AREAS ACCORDING TO COLOR INFORMATION

(75) Inventor: Toyohisa Matsuda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 778 days.

(21) Appl. No.: 12/787,999

(22) Filed: May 26, 2010

(65) Prior Publication Data

US 2010/0303360 A1   Dec. 2, 2010

(30) Foreign Application Priority Data

May 27, 2009   (JP) .................................. 2009-127425

(51) Int. Cl.
  *G06K 9/46*   (2006.01)
  *G06K 9/00*   (2006.01)
  *G06K 9/62*   (2006.01)

(52) U.S. Cl.
  USPC ............................ 382/195; 382/166; 382/224

(58) Field of Classification Search
  USPC ......................................................... 382/195
  See application file for complete search history.

(56) References Cited

U.S. PATENT DOCUMENTS

| 6,360,006 B1 * | 3/2002 | Wang ............................ 382/162 |
| 7,184,589 B2 * | 2/2007 | Okubo .......................... 382/166 |
| 2006/0210159 A1 * | 9/2006 | Huang et al. ................... 382/173 |

FOREIGN PATENT DOCUMENTS

| JP | 8-51540 A | 2/1996 |
| JP | 2000-132689 A | 5/2000 |
| JP | 2003-69843 A | 3/2003 |
| JP | 2004-30188 A | 1/2004 |
| JP | 2005-20227 A | 1/2005 |

* cited by examiner

*Primary Examiner* — David Zarka
(74) *Attorney, Agent, or Firm* — Birch, Stewart, Kolasch & Birch, LLP

(57) ABSTRACT

A foreground pixel block extraction process section divides input image data into a plurality of pixel blocks, and classifies each pixel block as a uniform density pixel block or foreground pixel block. By performing above process, the foreground pixel block extraction process section extracts foreground pixel blocks. A foreground color calculation process section calculates the foreground colors from the extracted foreground pixel blocks as color information. A labeling process section extracts connected foreground pixel block areas as foreground pixel areas by giving the same label to a plurality of adjacent foreground pixel blocks. From these processing results, a foreground pixel extraction process section calculates a representative color for each foreground pixel area, and extracts pixels having pixel values close to the representative color as foreground pixels.

10 Claims, 27 Drawing Sheets

FIG. 12
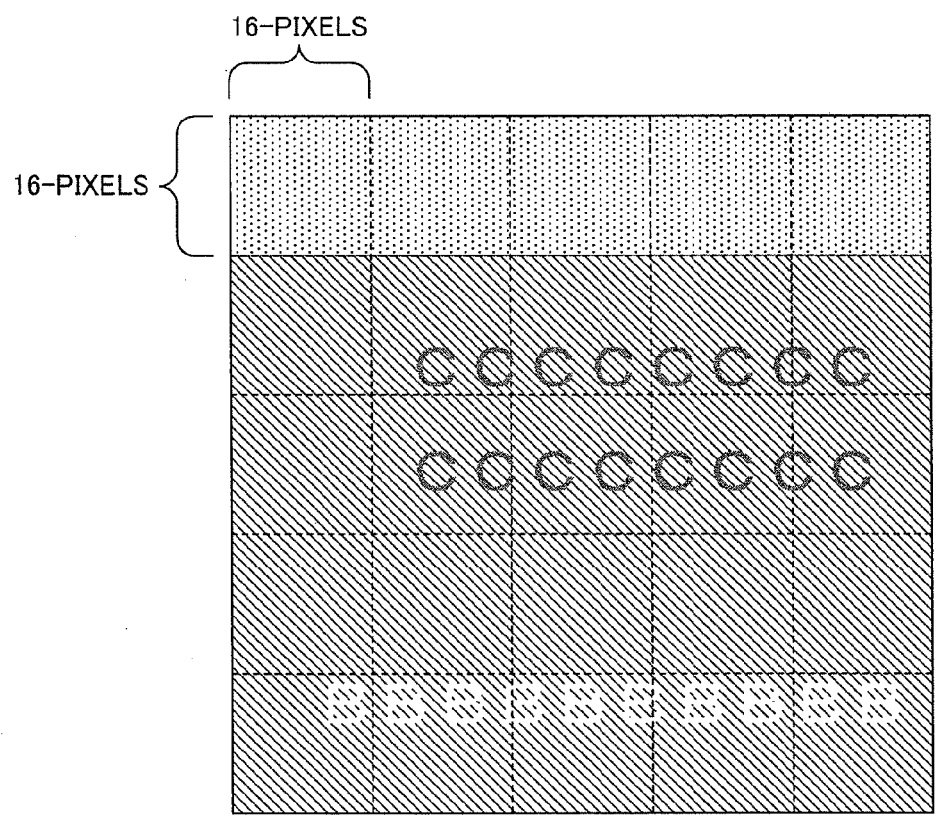
UNIFORM DENSITY PIXEL BLOCK
FOREGROUND PIXEL BLOCK FIG. 13
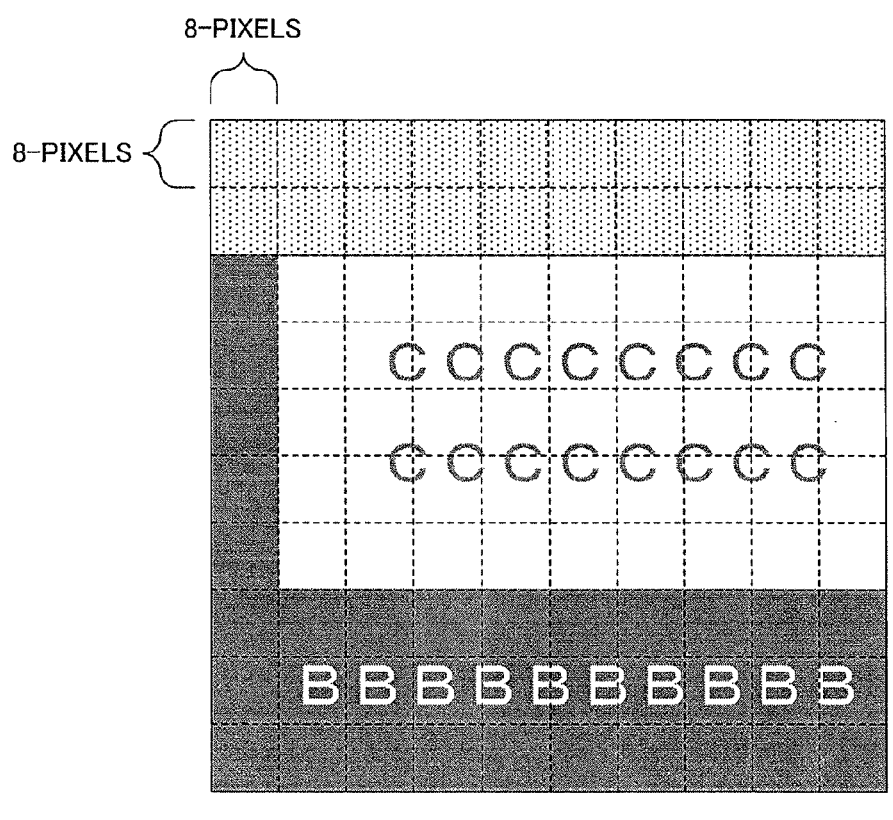
 UNIFORM DENSITY PIXEL BLOCK FIG. 14
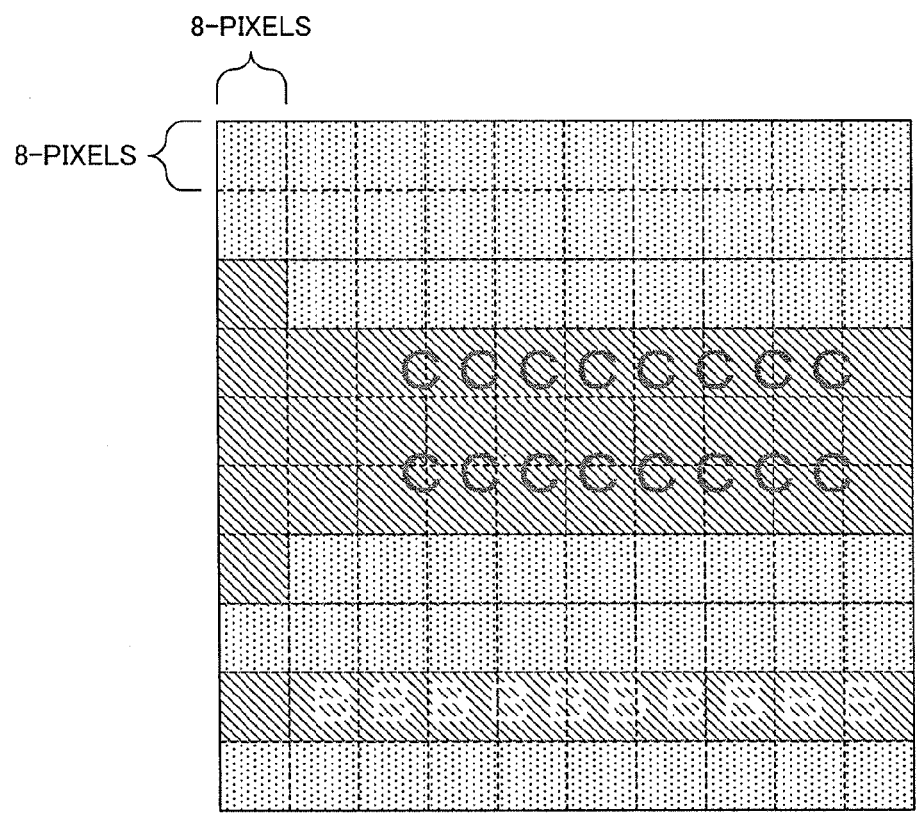
 UNIFORM DENSITY PIXEL BLOCK
 FOREGROUND PIXEL BLOCK FIG. 18
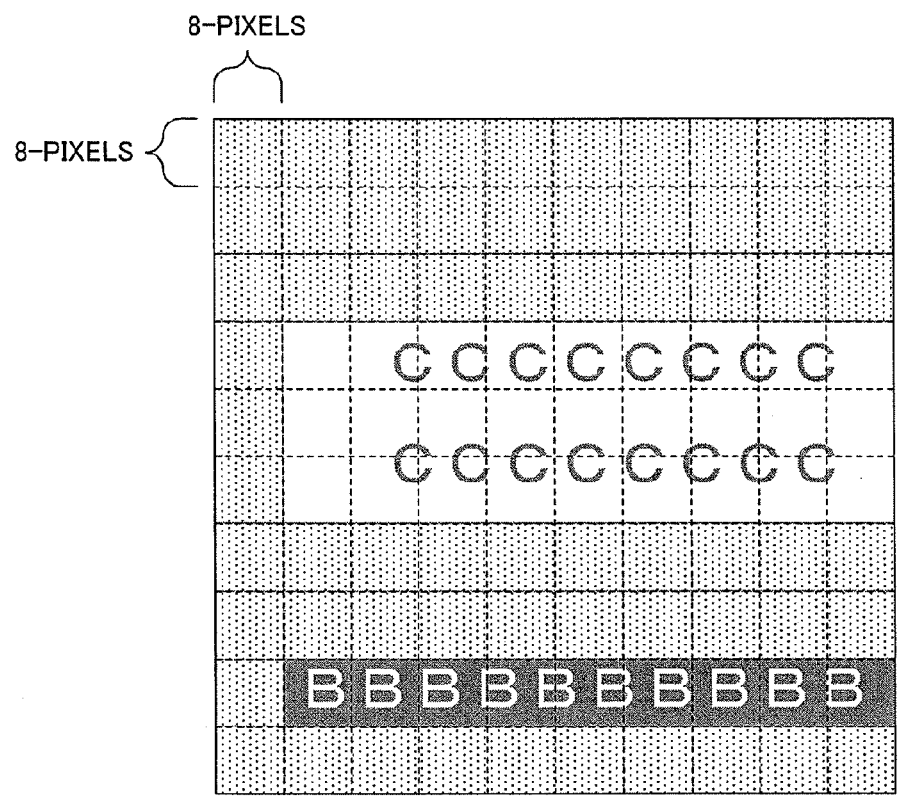

FIG. 20A
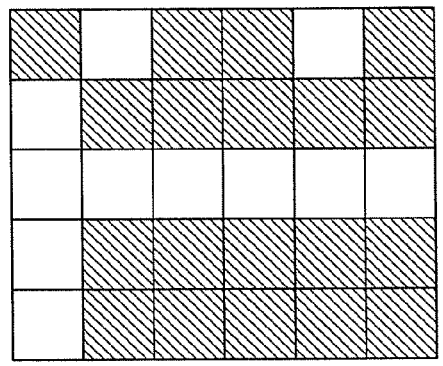
LABELING PROCESS
FIG. 20B
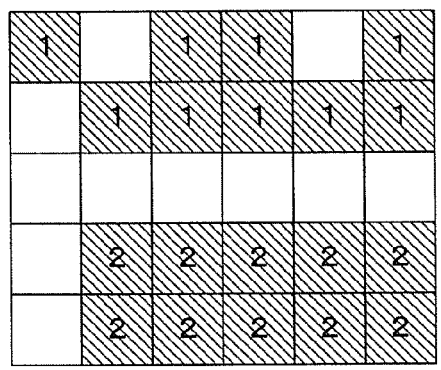
 FOREGROUND PIXEL BLOCK

IMAGE PROCESSING APPARATUS, EXTRACTING FOREGROUND PIXELS FOR EXTRACTED CONTINUOUS VARIABLE DENSITY AREAS ACCORDING TO COLOR INFORMATION

CROSS-REFERENCE TO RELATED APPLICATIONS

This Nonprovisional application claims priority under 35 U.S.C. §119(a) on Patent Application No. 2009-127425 filed in Japan on May 27, 2009, the entire contents of which are hereby incorporated by reference.

BACKGROUND

1. Technical Field

The present invention relates to an image processing apparatus, image processing method and recording medium that are capable of extracting foreground pixels from input image data with good accuracy when performing image processing such as image compression based on layer separation.

2. Description of Related Art

Conventionally, image formation apparatuses such as copy machines or multi-function peripherals that form images by using electronic photographic methods, inkjet methods or the like have been widely used. Moreover, recently, multi-function peripherals are becoming even more highly functionalized, with functions such as saving documents read by a scanner as electronic data, managing saved document files, transmitting document data as electronic mail and the like in demand. Documents that are read by a scanner are saved as image data, however, the size of this image data is generally large. Therefore, when storing or transmitting image data, technology for compressing images in order to reduce the amount of data is absolutely necessary.

One kind of image compression technology for achieving a high compression ratio is compression technology such as MRC (Mixed Raster Content) that separates an image into layers and compresses the image data. This compression technology separates the image related to the inputted image data into two layers of image data, a foreground layer and a background layer, and then compresses the image data of each layer. It is possible to increase the compression ratio of the final compressed image. The foreground layer is an image comprising text or line arts (hereafter referred to as text or the like), and compression by a lossless compression method such as JBIG (Joint Bi-level Image experts Group), MMR (Modified Modified Read) or LZW (Lempel Ziv Welch) is suitable. The background layer is an image of everything other than text or line arts, and compression by a lossy compression method such as JPEG (Joint Photographic Experts Group) is suitable.

Japanese patent application 2005-20227 (hereafter referred to as public document 1) discloses an image compression apparatus with the object of compressing read image data of color document images that include text or photographs at a high compression ratio without a decrease in legibility of text or the like. This image compression apparatus examines the drawn state of pixels that form a drawn object such as text or graphic from image data of a color document image read by a scanner or the like, and extracts a group of connected drawn pixels as a connected pixel group. Based on the characteristics of the pixels that make up the extracted connected pixel group, the image compression apparatus classifies an image into a foreground image that is suited for a compression method that places importance on resolution, and a background image that is suited for a compression method that places importance on color tone characteristics, and then compresses each image by the most suitable compression method.

SUMMARY

In images such as document images in which various colors are used locally as background color, or document images in which there are areas that include reverse text, properly separating the image into a foreground image and a background image is not easy.

When extracting connected pixels from image data, the image compression apparatus disclosed in public document 1 first binarizes color image data and extracts connected pixel groups based on the binarized image data, then of the plurality of extracted connected pixel groups, designates those within a predetermined size as the foreground image, and designates those beyond a predetermined size as the background image. However, because this image compression apparatus processes a color image by performing binarization, there are problems in that it is difficult to separate an image in which text is drawn in a local background color, into text pixels and background pixels; and it is also difficult to separate an image in a reverse text area where the relationship between the lightness of the page background and the lightness of text is reversed, into text pixels and background pixels.

FIGS. 1, 2A and 2B are schematic drawings for explaining the problems of the image compression apparatus that is disclosed in public document 1. FIG. 1 is an example of input image data 100 read by a scanner and inputted to the image compression apparatus. The input image data 100 includes, for example, image areas 101 to 105 in which text is written on the respective different color backgrounds, and an image area 106 that is a photo image. In addition, in image areas 101 to 105, various colors of text are written, and particularly in image areas 103 and 104, reversed text whose color is light on dark backgrounds is written.

FIG. 2A is an example of binarized input image data. Through the binarization process, image data 100 is obtained in which the text portion of image areas 101, 102 and 105, and the background portion of image data 103 and 104 are extracted. FIG. 2B is an example of the foreground pixels extracted on the basis of this binarized data. When the image compression apparatus disclosed in public document 1 extracted connected pixel groups on the basis of the binarized data illustrated in FIG. 2A, an area having a locally dark background color as in image areas 103 and 104 is extracted as a connected pixel group. Therefore, the text pixels included in this area cannot be extracted as foreground pixels. As a result, a portion of the text pixels that are included in the image data 100 cannot be extracted as foreground pixels, so there is a problem in that the image cannot be compressed by a suitable compression method.

Taking into consideration the circumstances described above, the object of the present invention is to provide an image processing apparatus, image processing method and recording medium that are capable of extracting foreground pixels with good accuracy even from input image data having a complicated layout such as an image in which text is written in a local background color, and an image that includes a reversed text area.

The image processing apparatus of the present invention is an image processing apparatus that extracts foreground pixels of a foreground image from input image data, comprising: a classifying section that divides an image area related to the input image data into a plurality of image areas, and classifies the plurality of image areas into uniform density areas and variable density areas that are areas other than the uniform density areas, in each of the uniform density areas the difference between pixel values of pixels included therein being less than a predetermined value; a continuous variable density area extraction section that extracts a plurality of adjacent variable density areas of the variable density areas classified by the classifying section as continuous variable density areas; a color information calculation section that calculates color information of the variable density areas; and a foreground pixel extraction section that extracts foreground pixels for each of the continuous variable density areas extracted by the variable density area extraction section according to the color information calculated by the color information calculation section.

Moreover, in the image processing apparatus of the present invention, the color information calculation section calculates a foreground color of each of the variable density areas as color information.

Furthermore, in the image processing apparatus of the present invention, the color information calculation section calculates pixel values from among pixel values of a plurality of pixels included in each of the variable density areas, whose difference with pixel values of pixels included in uniform density areas surrounding each of the variable density areas is greater than a predetermined value, as the foreground color; and the foreground pixel extraction section extracts pixels, whose difference in color with the foreground color is within a predetermined range, as the foreground pixels.

In addition, in the image processing apparatus of the present invention, the color information calculation section calculates a background color of each of the variable density areas as the color information.

Moreover, in the image processing apparatus of the present invention, the color information calculation section calculates a color of the uniform density areas surrounding each of the variable density areas as the background color thereof; and the foreground pixel extraction section extracts pixels, whose difference between the color thereof and the background color is beyond a predetermined range, as the foreground pixels.

Furthermore, in the image processing apparatus of the present invention, the classifying section includes an adjacent number calculation section that calculates the number of adjacent image areas in which the difference in pixel values is less than a predetermined value; and the classifying section classifies image areas for which the number of adjacent image areas calculated by the adjacent number calculation section exceeds a predetermined value as the uniform density areas.

In the image processing apparatus of the present invention, the adjacent number calculation section calculates from among image areas, whose difference between pixel values is less than a predetermined value and that are adjacent image areas, the number of image areas whose difference between average pixel values is within a predetermined value.

Moreover, in the image processing apparatus of the present invention, the classifying section performs, for each image area of a predetermined size, a classifying of whether the image area is one of the uniform density areas or is one of the variable density areas; divides each of image areas classified as the variable density areas into a size that is smaller than the predetermined size; and repeats the process of performing the classifying for each divided image area until the size of the image area is a predetermined size.

Furthermore, the image processing method of the present invention is an image processing method of extracting foreground pixels of a foreground image from input image data, comprising steps of: dividing an image area related to the input image data into a plurality of image areas; classifying the plurality of image areas into uniform density areas and variable density areas that are areas other than uniform density areas, in each of the uniform density areas the difference between pixel values of pixels included therein being less than a predetermined value; extracting a plurality of adjacent variable density areas of the classified variable density areas as continuous variable density areas; calculating color information of the variable density areas; and extracting foreground pixels for each of the extracted continuous variable density areas according to the calculated color information.

In addition, the recording medium of the present invention is a recording medium on which a computer program for extracting foreground pixels of a foreground image from input image data is recorded in the form of readable format with computer, the computer program comprising steps of causing a computer: to divide an image area related to the input image data into a plurality of image areas; to classify the plurality of image areas into uniform density areas and variable density areas that are areas other than the uniform density areas, in each of the uniform density areas the difference between pixel values of pixels included therein being less than a predetermined value; to extract a plurality of adjacent variable density areas of the classified variable density areas as continuous variable density areas; to calculate color information of the variable density areas; and to extract foreground pixels for each of the extracted continuous variable density areas according to the calculated color information.

In the present invention, the input image data is divided into the plurality of image areas, and each image area is classified into one of the uniform density areas or one of the variable density areas. Here, the uniform density areas are image areas in which the difference in pixel values between pixels is less than a predetermined value, and the variable density areas are image areas other than the uniform density areas. Determining the uniform density areas can be performed by calculating the difference between the maximum pixel value and minimum pixel value for each image area, and comparing this difference with the predetermined value. The uniform density areas can be estimated as being image areas comprising background images. Moreover, by taking areas in the image area related to the input image data that are not the uniform density areas to be the variable density areas, it is possible to estimate the variable density areas to be image areas that include the foreground pixels. Image areas are classified according to the difference in pixel values instead of using the result of binarizing the input image data, so even when an area includes the reverse text, it is possible to classify this area as one of the variable density areas.

Furthermore, from among the plurality of variable density areas, the plurality of adjacent variable density areas are extracted together as the continuous variable density areas. There is a high possibility that the plurality of adjacent variable density areas will be image areas in which foreground images are drawn on a common background image. Therefore, by handling these image areas together, it is possible to extract foreground pixels from the variable density areas with even better accuracy. It is also possible to extract foreground pixels from localized background images with good accuracy.

Moreover, color information such as the foreground color or background color is calculated for each of the variable density areas classified from the image area related to input image data. By extracting foreground pixels from the continuous variable density areas based on the calculated color information, it is possible to achieve highly accurate extraction of foreground pixels.

Furthermore, in this invention, the foreground color, which is color information of the foreground images, is calculated as the color information of each of the variable density areas. Therefore, by extracting pixels from the continuous variable density areas, of colors close to this foreground color (pixels whose difference between the pixel values with this foreground color is within a predetermined range) according to the calculated foreground color, it is possible to extract foreground pixels.

In addition, in this invention, when calculating the foreground color as the color information, the pixel values of the variable density areas are compared with the pixel values of the surrounding uniform density areas. The pixel values of each of the variable density areas, whose difference with the pixel values included in each of the uniform density areas is large, can be calculated as the foreground color, and a pixel, whose color is close to this foreground color, can be extracted as a foreground pixel. A pixel in which the difference in pixel values with the pixel values of each of the uniform density areas is large is extracted as a foreground pixel, so it is possible to perform extraction with good accuracy even in the case of the reverse text having a dark background and light foreground.

Moreover, in the present invention, the background color, which is color information for a background image, is calculated as color information for each of the variable density areas. Therefore, by extracting pixels from each of the continuous variable density areas whose difference between the color thereof and this background color is large (pixels whose difference between the pixel value thereof and that of the background color is beyond a predetermined range) according to the calculated background color, it is possible to extract background pixels.

Furthermore, in this invention, when calculating the background color as the color information, the color (average color) of the uniform density areas surrounding each of the variable density areas can be calculated as the background color thereof, and pixels, whose difference between the color thereof and this background color is large, can be extracted as foreground pixels. Pixels, whose difference between the color thereof and that of the uniform density areas is large, can be extracted as foreground pixels, so extraction can be performed with good accuracy even for the reverse text having a dark background color and light foreground color.

In the present invention, image areas, whose difference between pixel values thereof is less than a predetermined value, are extracted from input image data, and when these image areas are adjacent in the image area related to the input image data, the number of these adjacent image areas is calculated. When the number of adjacent image areas, whose difference between pixel values is small, exceeds a predetermined number, these image areas form a uniform density image, and can be classified as being the uniform density areas. When determining whether or not each of the image areas is one of the uniform density areas, the determination is based on information for a plurality of surrounding image areas instead of information for only one image area, so it is possible to classify image areas into the uniform density areas and the variable density areas with better accuracy.

Moreover, in the present invention, when calculating the number of adjacent image areas having a small difference in pixel values, the number of adjacent image areas is not counted when the difference between the average pixel values is not within a predetermined range even when the image areas are adjacent, and is only counted when the difference between average pixel values is within a predetermined range. When the difference between average pixel values for each of the image areas is large even though the image areas are adjacent image areas, it is likely that those image areas are not uniform density image areas. Therefore, by eliminating these kinds of image areas from the calculation of the number of adjacent image areas, it is possible to prevent mistakes in classifying image areas.

Furthermore, in the present invention, the image area related to the input image data is divided into image areas having a predetermined size, and whether or not each image area is one of the uniform density areas or one of the variable density areas is determined. When doing this, image areas that are determined to be the variable density areas are further divided into image areas having a smaller size, and whether or not the divided image areas are the uniform density areas or the variable density areas is further determined. In this way, the division of the image area and the determination of whether or not each of the divided image areas are one of the uniform density areas or one of the variable density areas are repeated until the size of the image area is a predetermined size, and the final determination results become the classifying results of the image area. In this way, even though the image area related to the input image data has a complex layout with a plurality of localized background images, it is possible to classify the image areas into the uniform density areas and the variable density areas with good accuracy, and thus foreground pixels can be extracted with good accuracy.

With the present invention, the image area related to the input image data is classified into the uniform density areas or the variable density areas, adjacent variable density areas are extracted as continuous variable density areas, and based on color information for each of the variable density areas, foreground pixels are extracted for each of the continuous variable density areas. Therefore, even when an image includes an area of the reverse text, it is possible to extract pixels that form the text as foreground pixels with good accuracy. It is possible to extract foreground pixels from images having a complex layout with good accuracy, and by separating images into foreground images and background images with good accuracy, it is possible to compress each image with a suitable compression method. Therefore, it is possible to improve the compression ratio of the image.

The above and further objects and features will be more fully apparent from the following detailed description with accompanying drawings.

BRIEF DESCRIPTION OF THE SEVERAL VIEWS OF THE DRAWINGS

FIG. 12 is a schematic drawing for explaining a foreground pixel block extraction process that is performed by the foreground pixel block extraction section.

FIG. 13 is a schematic drawing for explaining a foreground pixel block extraction process that is performed by the foreground pixel block extraction section.

FIG. 14 is a schematic drawing for explaining a foreground pixel block extraction process that is performed by the foreground pixel block extraction section.

FIG. 18 is a schematic drawing for explaining a foreground pixel block extraction process that is performed by the foreground pixel block extraction section.

FIGS. 20A and 20B are schematic drawings for explaining a labeling process that is performed by a labeling section.

DETAILED DESCRIPTION (Embodiment 1)

The preferred embodiments of the present invention will be explained in detail below on the basis of the drawings. In these embodiments, the present invention will be explained using a digital color multi-function peripheral (hereafter, referred to as an MFP) as an example. An MFP has multiple functions such as a color copy function, color printer function and color scanner function. The technology of the present invention can be applied to, for example, the case of compressing color images that are obtained by reading a color document. The technology of the present invention is very suitable for the color copy function and color scanner function of an MFP, for example. Moreover, the color scanner function of an MFP includes functions such as a data transmission function of compressing color image data that is obtained by reading a color document and transmitting that data to another apparatus, and a saving function that compresses color image data and stores that data in an internal memory of the MFP or the like. The technology of the present invention can be applied to the case of compressing image data in these functions.

Figure 3:
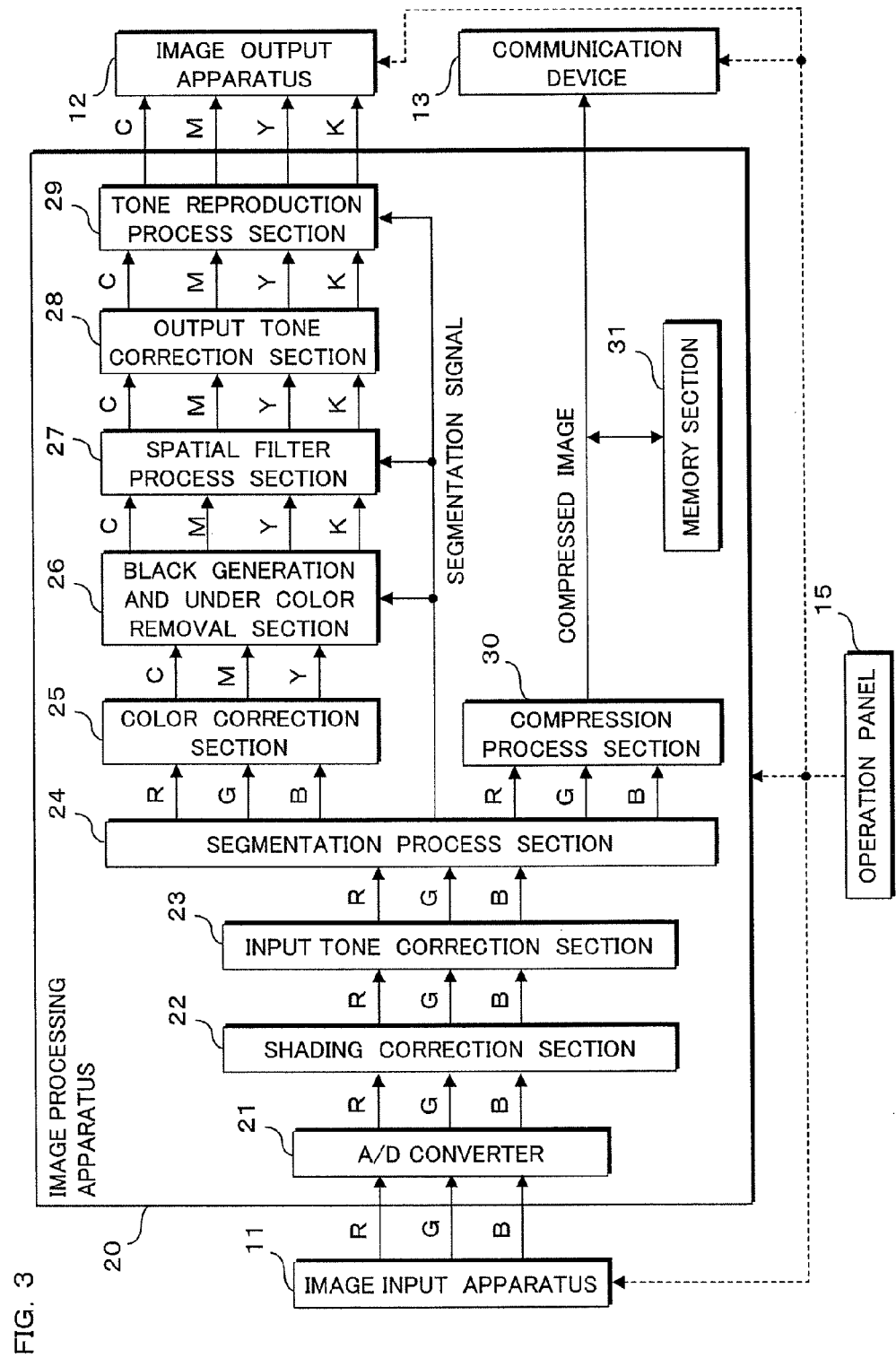
FIG. 3 is a block diagram of an MFP construction of Embodiment 1 of the present invention.
Figure 4A:
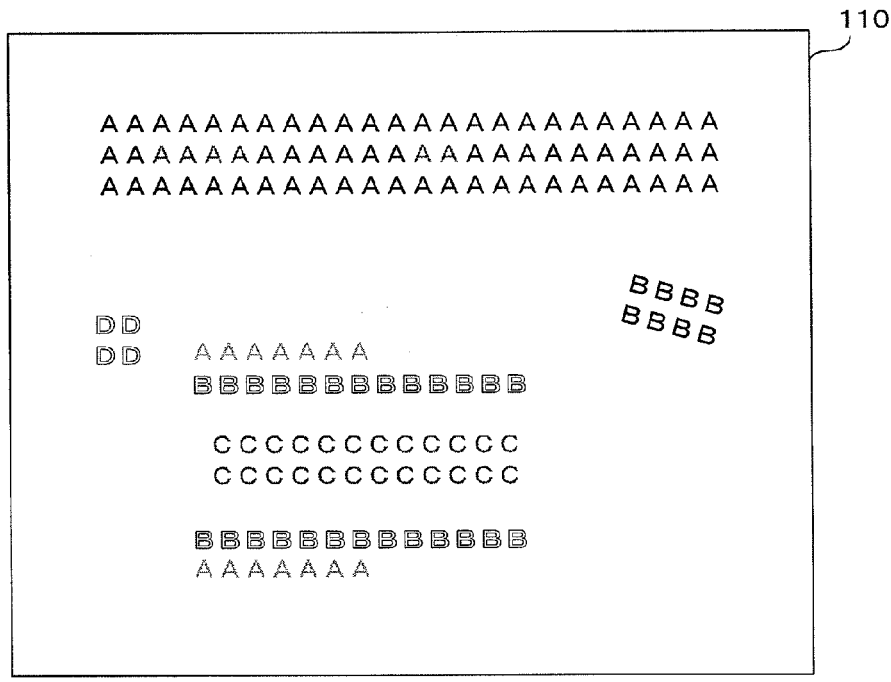
FIGS. 4A and 4B are schematic drawings for explaining an image data compression process performed by a compression process section of an image processing apparatus.
Figure 4B:
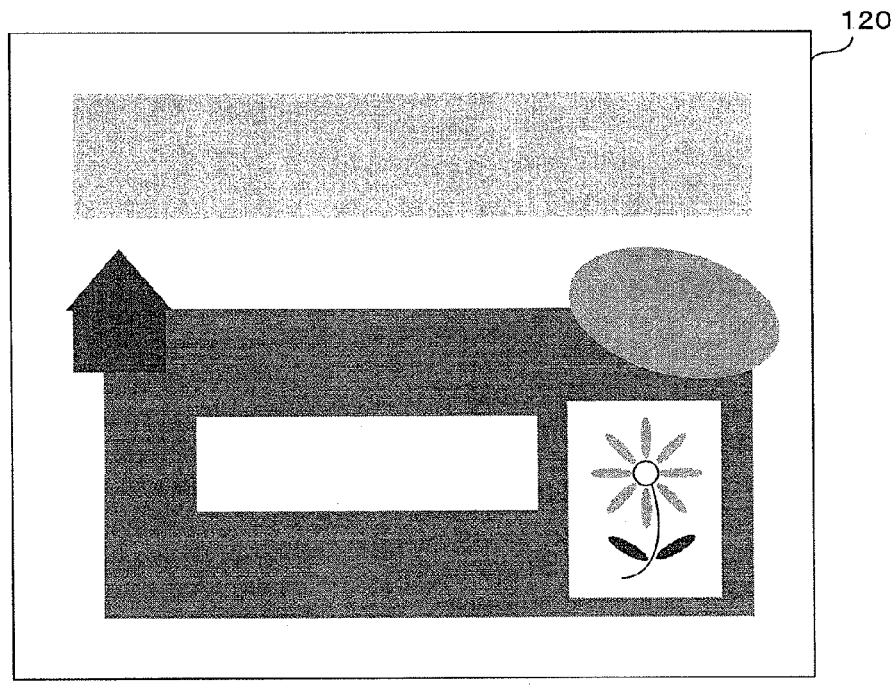
Figure 5A:
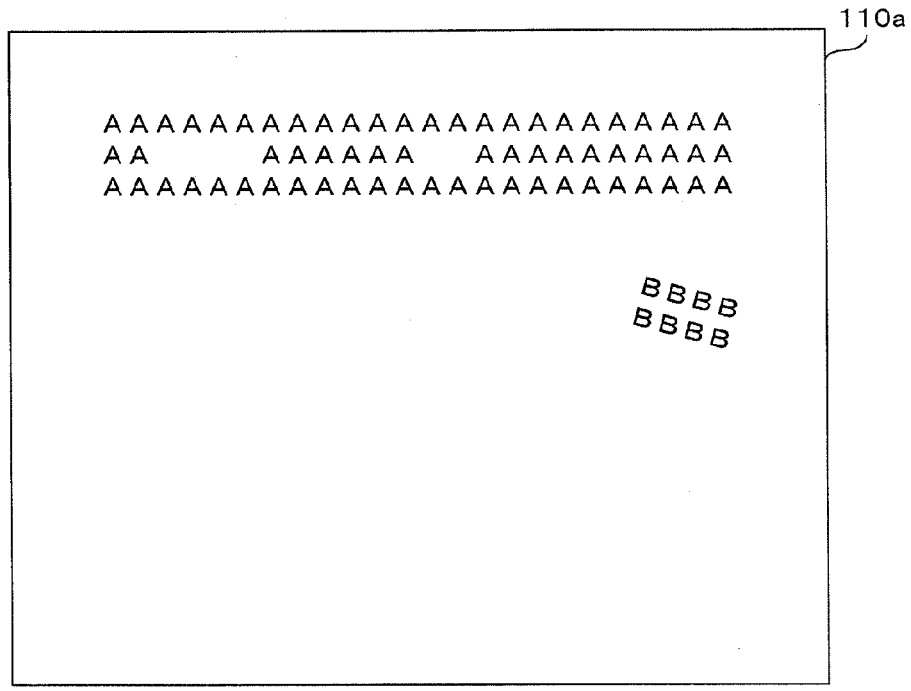
FIGS. 5A and 5B are schematic drawings for explaining an image data compression process performed by the compression process section of the image processing apparatus.
Figure 5B:
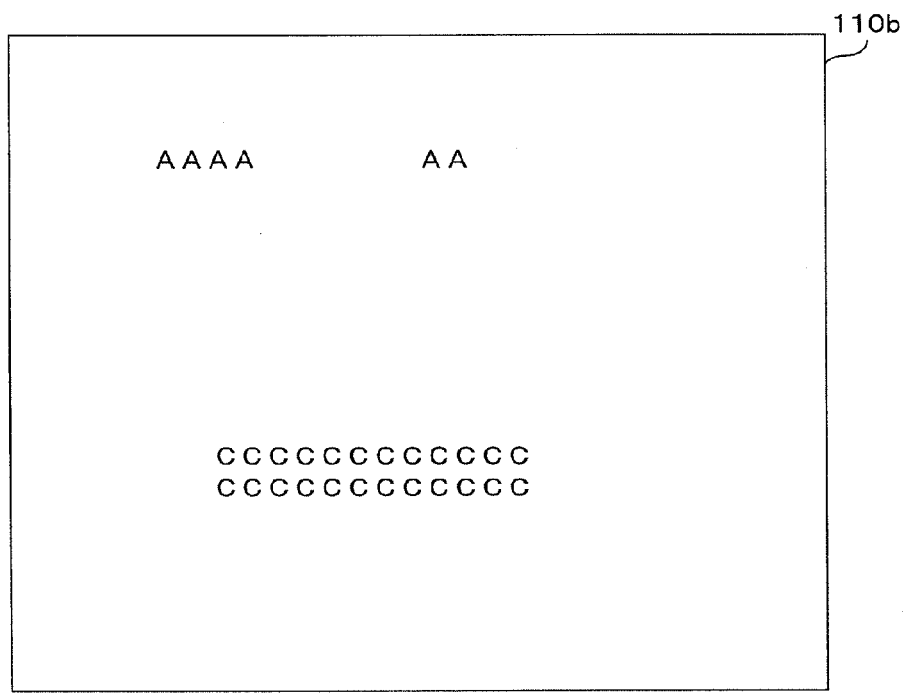
Figure 6A:
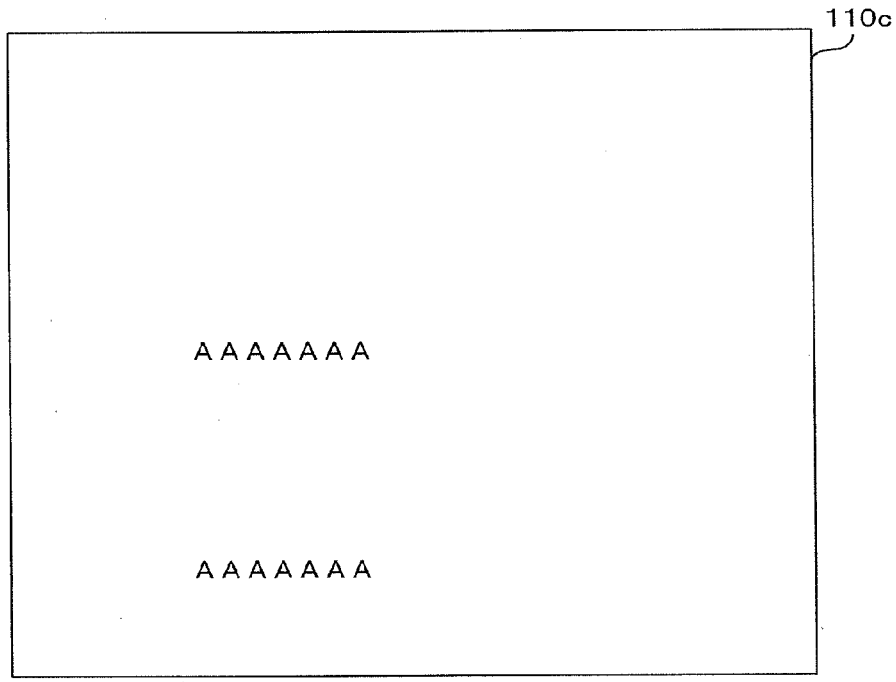
FIGS. 6A and 6B are schematic drawings for explaining an image data compression process performed by the compression process section of the image processing apparatus.
Figure 6B:
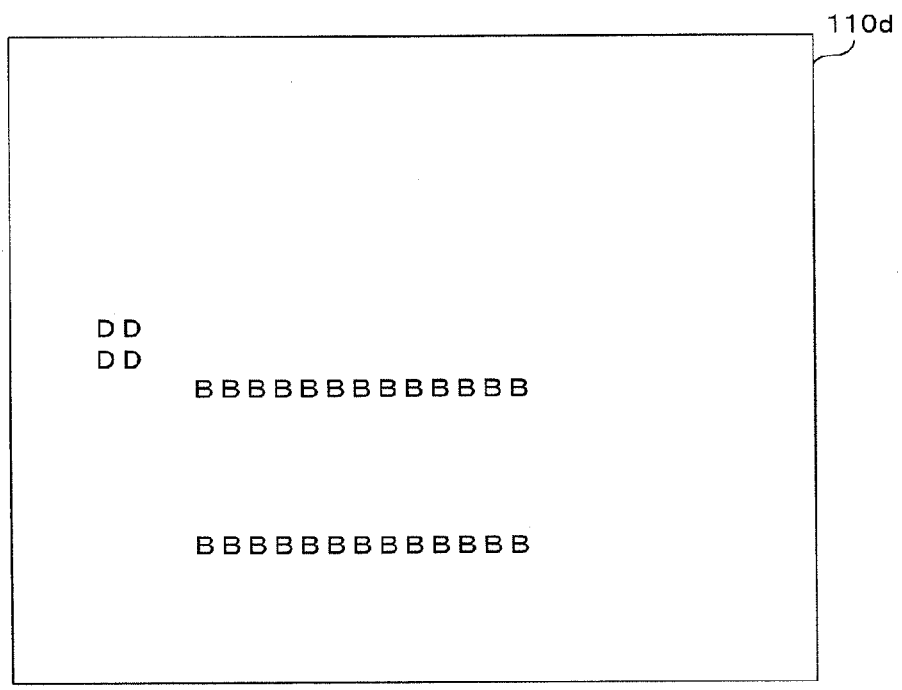

FIG. 3 is a block diagram of the construction of an MFP of Embodiment 1 of the present invention. The MFP of this embodiment comprises an image input apparatus 11, an image output apparatus 12, a communication device 13, an operation panel 15, an image processing apparatus 20, and the like. The operation panel 15 has hardware keys such as setting buttons and a ten-key pad for setting the operating modes of the MFP, a start key that receives an instruction to start processing, and a power key and various function keys. In addition, the operation panel 15 has a display for displaying the operating state of the MFP, warning messages to a user, various menus for assisting operation by the user and the like. Instead of hardware keys for receiving user controls, a touch panel can be provided on the display. The operation panel 15 outputs received instructions, received settings or the like to the image input apparatus 11, image output apparatus 12, communication device 13 and image processing apparatus 20. Respective apparatus or device can perform processing according to received instructions, received settings or the like.

The image input apparatus 11 is a scanner that comprises a light source for irradiating light on a document, and a light receiving section provided with an array of image sensors such as CCDs (Charge Coupled Device). The image input apparatus 11 irradiates light on a document from the light source, and moves the light receiving section in one direction, and reads the light reflected from the document as the three color components R (red), G (green), B (blue) by using the CCD and outputs the analog signal to the image processing apparatus 20.

The image processing apparatus 20 comprises an A/D converter 21, a shading correction section 22, input tone correction section 23, segmentation process section 24, color correction section 25, black generation and under color removal section 26, spatial filter process section 27, output tone correction section 28, tone reproduction process section 29, compression process section 30, memory section 31 and the like. The RGB analog signal inputted from the image input apparatus 11 is processed by each of the sections from the A/D converter 21 to the tone reproduction process section 29 of the image processing apparatus 20, and the processed RGB analog signal is outputted to the image output apparatus 12, or is processed by each of the sections from the A/D converter 21 to the segmentation process section 24 and compression process section 30, and the processed RGB analog signal is outputted to the communication device 13.

The A/D converter 21 converts the RGB signal received from the image input apparatus 11 to 8-bit digital image data, for example, and outputs the converted RGB image data to the shading correction section 22. The shading correction section 22 performs a shading process on the RGB image data received from the A/D converter 21 in order to remove various distortion that occurs in the lighting system, image focusing system, image sensing system and the like of the image input apparatus 11, then outputs the RGB image data for which the shading process has been performed to the input tone correction section 23.

The input tone correction section 23 adjusts the color balance, contrast and the like of the RGB image data from which distortion has been removed by the shading correction section 22 (RGB reflectance signal), and converts signals, such as the density signal, to signal formats that are suitable for processing by the image processing apparatus 20, and outputs the processed RGB image data to the segmentation process section 24.

The segmentation process section 24 determines whether the pixels of the image related to the RGB image data that is received from the input tone correction section 23 respectively belong to the text area that comprises text image data, the halftone area that comprises halftone image data, or the photograph area that comprises photograph image data so as to segment the pixels. The segmentation process section 24 outputs a result of segmentation process, that is information that indicates which area each of the pixels belongs to, to the black generation and under color removal section 26, spatial filter process section 27 and tone reproduction process section 29, and outputs the RGB image data received from the input tone correction section 23 to the color correction section 25 and compression process section 30 without any modification.

The color correction section 25 converts the RGB image data received from the segmentation process section 24 to image data of color space of C (cyan), M (magenta), Y (yellow), and performs color correction of each of the CMY color components in order to achieve a faithful color reproduction by the image output apparatus 12. More specifically, the color correction process is a process for removing color impurity from each of the CMY color components based on spectral characteristics of the CMY toner or ink that includes unnecessary absorbed components. The color correction section 25 outputs the converted CMY image data to the black generation and under color removal section 26.

The black generation and under color removal section 26 performs a black generation process that generates the K (black) color component on the basis of segmentation signal received from the segmentation process section 24 and each color component of CMY image data received from the color correction section 25. Moreover, the black generation and under color removal section 26 removes the K component generated by the black generation process from each of the original CMY color components, and generates new CMY image data. The CMY image data received from the color correction section 25 is converted to image data having the four color components CMYK.

For example, in the case of performing the black generating process using skeleton black, by taking the input/output characteristics of the skeleton curve to be y=f(x), taking the pixel values of the inputted image to be C, M and Y, taking the outputted pixel values to be C', M', Y' and K', and taking the UCR (Under Color Removal) rate to be α (0<α<1), the black generation and under color removal process can be expressed by the equation below. The CMYK image data converted by the black generation and under color removal process of the black generation and under color removal section 26 is outputted to the spatial filter process section 27.

$$K'=f\{\min(C, M, Y)\}$$

$$C'=C-\alpha K'$$

$$M'=M-\alpha K'$$

$$Y'=Y-\alpha K'$$

The spatial filter process section 27 performs a spatial filter process using a digital filter on an image related to the CMYK image data received from the black generation and under color removal section 26 on the basis of the segmentation signal received from the segmentation process section 24. The spatial frequency characteristic of the image is corrected, and it is possible to prevent blurring, degradation due to graininess, or the like of the image that will be outputted by the image output apparatus 12. The CMYK image data related to images for which the spatial filter process section 27 has performed the spatial filter process subjects to an output tone correction process by the output tone correction section 28 based on the output characteristics of the image output apparatus 12 and then the processed CMYK image data is outputted to the tone reproduction process section 29.

The tone reproduction process section 29 performs a tone reproduction process on the CMYK image data received from the output tone correction section 28 according to the segmentation signal received from the segmentation process section 24. The tone reproduction process is a process that reproduces halftones. A method such as the binarization process, multi-level dithering method or error diffusion method can be used for the tone reproduction process.

For example, in the area segmented as the text area by the segmentation process section 24, the spatial filter process section 27 enhances (sharpens) the high-frequency component by performing an edge enhancement filter process especially for the purpose of improving reproducibility of black or color text. The tone reproduction process section 29 performs a binarization process or multi-level dithering process using a high resolution screen that is suitable to reproduction of the high-frequency component by the image output apparatus 12 on the area segmented as a text area by the segmentation process section 24 especially to improve the reproducibility of black or color text.

Moreover, in the area segmented by the segmentation process section 24 as the halftone area, the spatial filter process section 27 performs a low-pass filter process to remove the input halftone component. The output tone correction section 28 performs a correction process on the image data for which the filter process was performed to convert the image data to a halftone area ratio, which is a characteristic value of the image output apparatus 12. The tone reproduction process section 29 performs halftone process for the image for which output tone correction processing was performed and each tone of the pixels can be reproduced.

In addition, in the area segmented by the segmentation process section 24 as the photograph area, the tone reproduction process section 29 performs binarization process or multi-level dithering process using a screen suitable for tone reproduction.

The CMYK image data for which processing was performed by the tone reproduction process section 29 is temporarily stored in a memory section such as an image memory (not shown in the figure), and then the image data is read from that memory section in correspondence to the image formation timing and the read image data is outputted to the image output apparatus 12. The image output apparatus 12 is an apparatus that outputs the image related to the received image data onto a recording medium such as paper, and is an electrophotographic or inkjet type printer. For example, in the case of an electrophotographic type printer, the image output apparatus 12 comprises: an electrostatic charger that charges a photoreceptor drum to a predetermined potential; a laser scanning unit that emits a laser light according to a received image signal and generates an electrostatic latent image on the surface of the photoreceptor drum; a developing unit that supplies toner to the electrostatic latent image generated on the surface of the photoreceptor drum and generates a visual image; and a transfer unit that transfers the toner image formed on the photoreceptor drum to paper. The image output apparatus 12 can also be a display apparatus such as a display.

The compression process section 30 of the image processing apparatus 20 performs a compression process on the RGB image data received from the segmentation process section 24 in order to reduce the amount of data, and stores the compressed image data in the memory section 31. The memory section 31 comprises a large capacity of memory elements such as a hard disk or flash memory, and the image data stored in the memory section 31 is outputted to the communication device 13.

The communication device 13 has a plurality of communication hardware such as a network card or modem, and through these communication sections, transmits image data to other apparatuses. For example, when the operation panel 15 is used to set the MFP operating mode to electronic mail transmission, the communication device 13 attaches image data stored in the memory section 31 to electronic mail, and transmits that image data to a preset address. Moreover, when performing a facsimile transmission, the communication device 13 is kept in a state capable of transmitting image data by using the modem to perform the transmission procedure for the inputted destination. After that, the communication device 13 reads the image data, which was read by the image input apparatus 11 and compressed using a predetermined format, from the memory section 31, and performs any necessary processing for facsimile communication such as converting the compression format on the read image data, and sequentially transmits the processed image data to the destination via communication lines.

Furthermore, though not shown in the figures, the communication device 13 may have a function as a receiving apparatus for receiving image data transmitted by facsimile communication from another apparatus. In that case, the communication device 13, while performing a communication procedure, receives image data transmitted from an originating communication device, and outputs that received image data to the image processing apparatus 20. The image processing apparatus 20 performs decompression processing of the received image data and performs image processing of the decompressed image data such as rotation processing or resolution conversion if necessary, then performs the output tone correction process by the output tone correction section 28 and the tone reproduction process by the tone reproduction process section 29 and outputs the processed image data to the image output apparatus 12. The image related to the image data received by the communication device 13 through facsimile communication is formed and the formed image is output.

The communication device 13 can also perform data communication with another apparatus having a communication function such as a computer or MFP connected to a network such as an LAN (Local Area Network) via a network card, network cable and the like. The MFP can send image data read by the image input apparatus 11 to other apparatuses, and save that image data, or can output image data received from another apparatus by the image output apparatus 12.

Various processing, such as the image formation process and image transmission process described above, is performed by each section being controlled by a CPU (Central Processing Unit) (not shown in the figure) mounted in the MFP.

Figure 1:
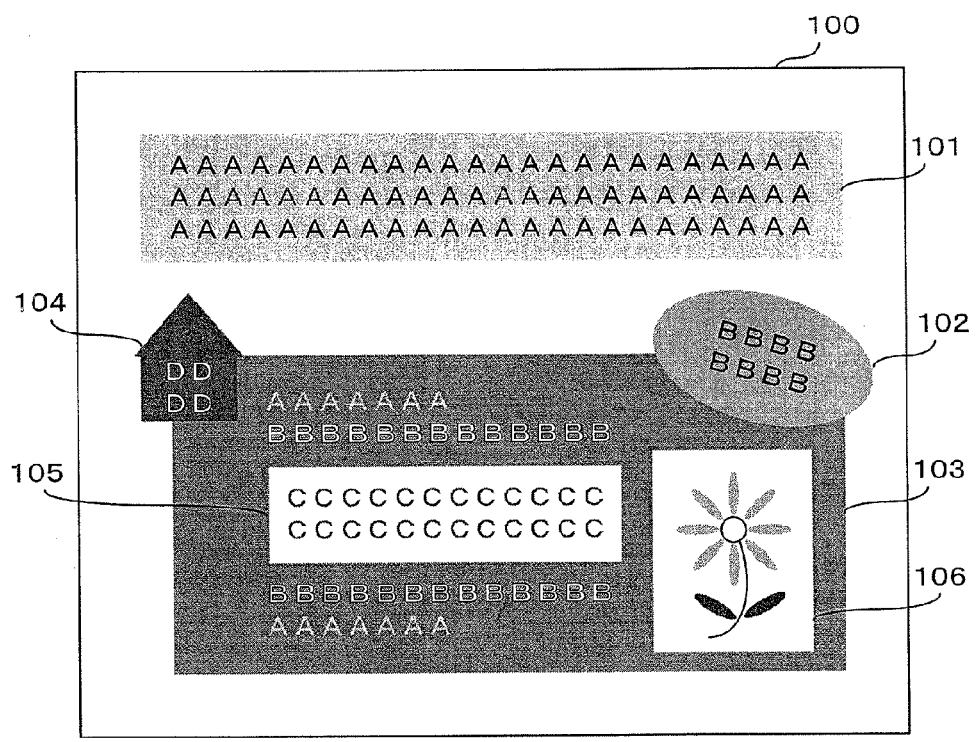
FIG. 1 is a schematic drawing for explaining the problems of the image compression apparatus that is disclosed in public document 1.
Figure 2A:
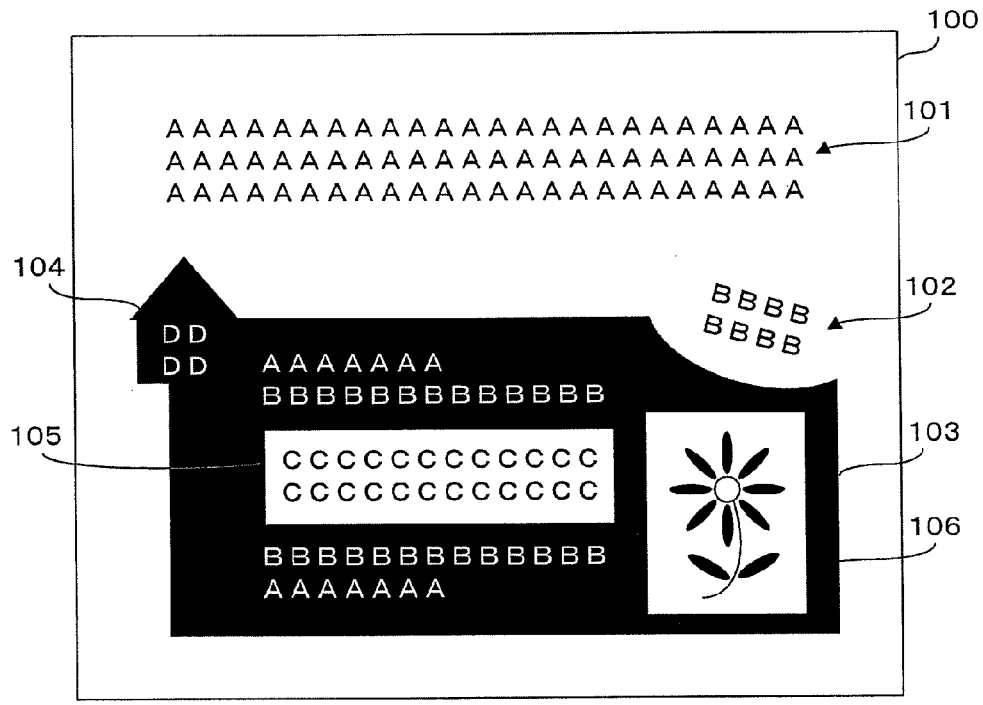
FIGS. 2A and 2B are schematic drawings for explaining the problems of the image compression apparatus that is disclosed in public document 1.
Figure 2B:
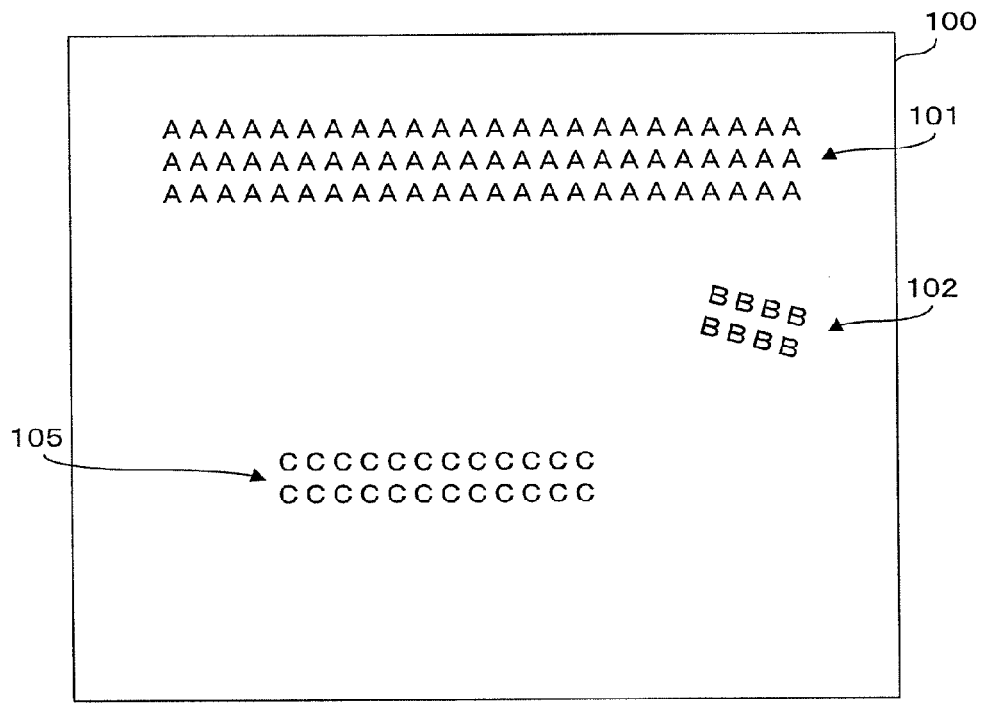

FIGS. 4A, 4B, 5A, 5B, 6A and 6B are schematic drawings for explaining the image data compression process performed by the compression process section 30 of the image processing apparatus 20, and illustrate the case of the compression process section 30 performing compression process of the input image data 100 illustrated in FIG. 1. The compression process section 30 of the image processing apparatus 20 of the present invention separates the input image data 100, which was received from the image input apparatus 11, and for which various image processing was performed by the A/D converter 21 to segmentation process section 24, into a foreground layer 110 that includes text, line arts and the like (see FIG. 4A), and a background layer 120 that comprises images other than text and line arts (see FIG. 4B). When separating the input image data 100 into a foreground layer 110 and background layer 120 by performing processing that will be described later, the compression process section 30 makes it possible to more precisely extract the foreground pixels that form the text, line arts and the like of the foreground layer 110.

The compression process section 30 indexes the pixel colors for the foreground layer 110 separated from the input image data 100, and finally compresses the foreground layer 110 using lossless compression technology such as JBIG, MMR or LZW. The compression process section 30 also compresses the background layer 120 using lossy compression technology such as JPEG.

Moreover, the compression process section 30 separates the foreground layer 110 into a plurality of masks in which each pixel is converted to 1-bit data, and color information for each mask, and compresses each mask by lossless compression technology and compresses color information for each mask using lossless compression technology or lossy compression technology. FIGS. 5A, 5B, 6A and 6B illustrate four masks 110a to 110d separated from the foreground layer 110 for each color. By the compression process section 30 separating the foreground layer 110 into a plurality of masks 110a to 110d and compressing the foreground layer 110, the compression ratio can be improved more than when directly compressing the foreground layer 110 having pixel values of a plurality of bits.

Figure 7:
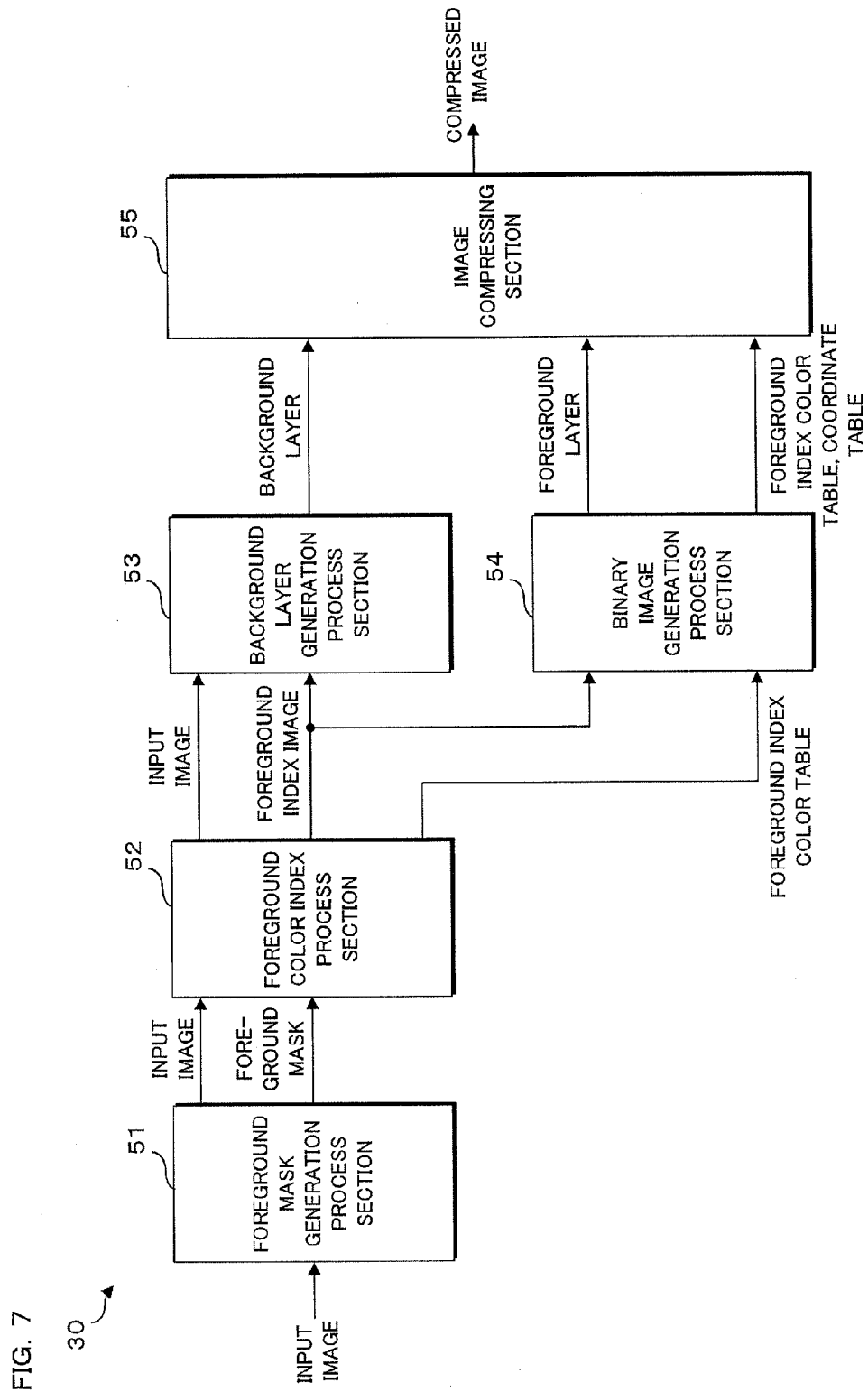
FIG. 7 is a block diagram that illustrates the construction of the compression process section of the image processing apparatus.

FIG. 7 is a block diagram of the construction that illustrate the construction of the compression process section 30 of the image processing apparatus 20. The compression process section 30 comprises: a foreground mask generation process section 51, a foreground color index process section 52, a background layer generation process section 53, binary image generation process section 54, image compressing section 55 and the like.

The foreground mask generation process section 51 extracts a foreground mask that represents pixels (foreground pixels) of text or line arts (hereafter, referred to as text or the like) from input image data (simply noted as an input image in FIG. 7). The foreground mask generation process section 51 outputs the generated foreground mask (and color information) and input image data to the foreground color index process section 52.

The foreground color index process section 52 performs an indexing process on the foreground mask (and color information) of the input image data, and creates an index image in which the pixel values of the foreground mask have been indexed, and an index color table in which information such as pixel values and number of pixels for the index are stored. More specifically, the foreground index color table is a table in which the colors of the foreground pixels (pixel values) and an index attached to these colors are stored, and the foreground color index process section 52 determines for each of the foreground pixels of the foreground mask whether or not the color of the foreground pixels have been registered in the foreground index color table. When the color of a foreground pixel is registered (including the case in which colors close to the color of a foreground pixel are registered), the foreground color index process section 52 obtains the index corresponding to that color from the foreground index color table, and assigns the obtained index to the foreground pixel that is the object of processing. When the color of a foreground pixel is not registered, the foreground color index process section 52 assigns a new index to the foreground pixel that is the object of processing and correlates that index with the color of the foreground pixel and registers that information in the foreground index color table. The foreground color index process section 52 repeats these processes for all of the foreground pixels and updates the foreground index color table. The foreground color index process section 52 finally indexes the foreground pixels. The foreground color index process section 52 outputs the input image data and foreground index image to the background layer generation process section 53, and outputs the foreground index image and foreground index color table to the binary image generation process section 54.

The background layer generation process section 53 generates a background layer by removing the foreground pixels from the input image data. In order to improve the compression ratio of the background layer, the background layer generation process section 53 uses the background pixels around foreground pixels of the input image data to compensate for the portion of the foreground pixels of the input image data. More specifically, the background layer generation process section 53 references the foreground pixels included in the foreground index image, and compensates for the portion corresponding to the foreground pixels of the input image data by using the pixel values (average values of the background pixels or the like) that exist around those foreground pixels. The background layer generation process section 53 generates a background layer. At this time, when there are no background pixels near the foreground elements, the background layer generation process section 53 may compensate for those pixels by using the results of a nearby compensation process. The background layer generation process section 53 outputs the generated background layer to the image compressing section 55.

The binary image generation process section 54 uses the received foreground index image and foreground index color table to generate a binary image for each of the indexes of the foreground index color table. The binary image generation process section 54 takes an index value of the foreground index image, for example only the pixels of the value '10', to be '1', and takes the pixels of all other values to be '0', and thus is able to generate a binary image for the index value '10'. Therefore, the binary image generation process section 54 generates binary images for the number of indexes included in the foreground index image, and outputs these binary images to the image compressing section 55 as a foreground layer. In addition, the binary image generation process section 54, together with the foreground layer, generates a foreground index color table, and a coordinate table that stores the maximum and minimum coordinates of the areas of each index, and outputs these tables to the image compressing section 55.

The image compressing section 55 suitably compresses the received foreground layer and background layer in order to reduce the amount of image data. The image compressing section 55 compresses the foreground layer by using, for example, the lossless compression method MMR, and compresses the background layer by using, for example, the lossy compression method JPEG. Compression methods such as MMR and JPEG are already known, so a detailed explanation of them is omitted. Moreover, together with the foreground and background layers, the image compressing section 55 compresses data such as the foreground index color table.

The compression process section 30 outputs image data for which both the foreground layer and background layer were compressed by the image compressing section 55. The image data compressed by the compression process section 30 is stored in the memory section 31 of the image processing apparatus 20. The communication device 13 transmits that image data to other apparatuses through electronic mail or facsimile communication.

Figure 8:
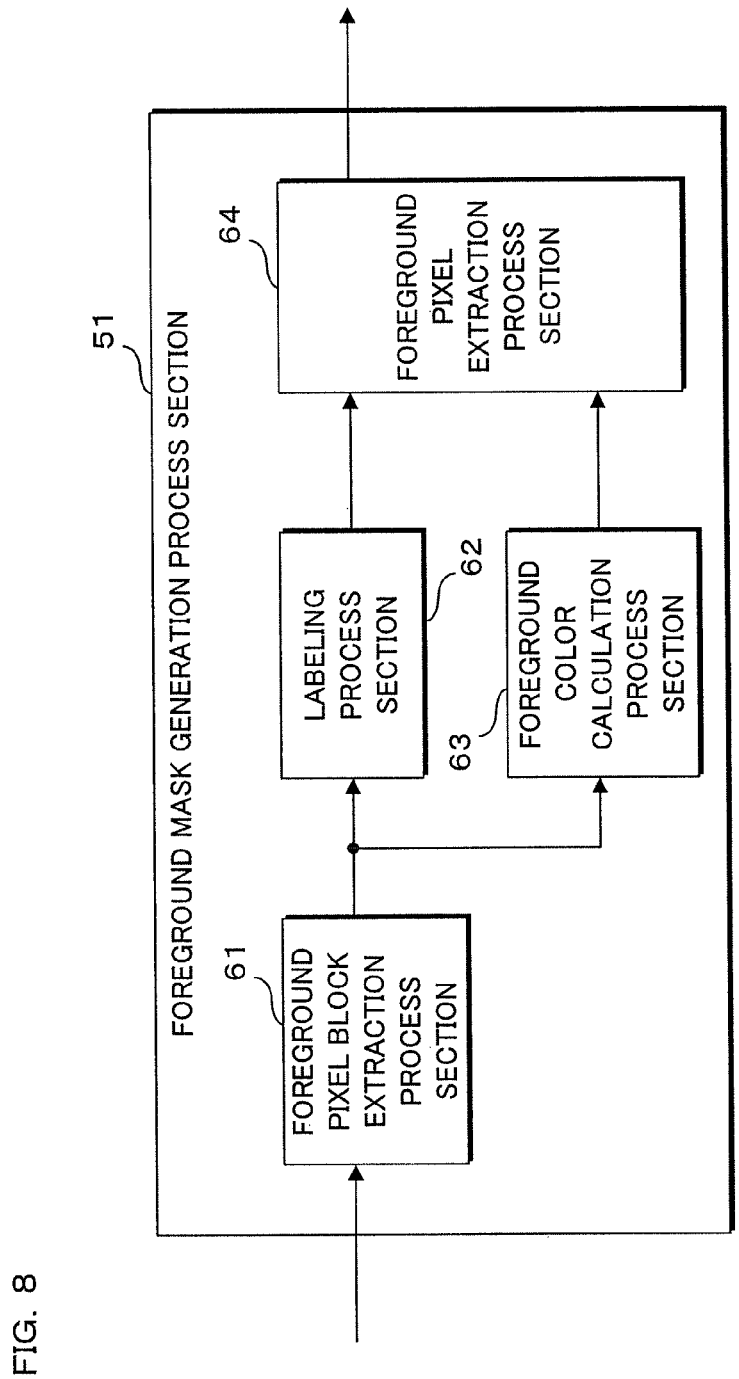
FIG. 8 is a block diagram that illustrates in detail the construction of a foreground mask generation section of the compression process section.
Figure 9:
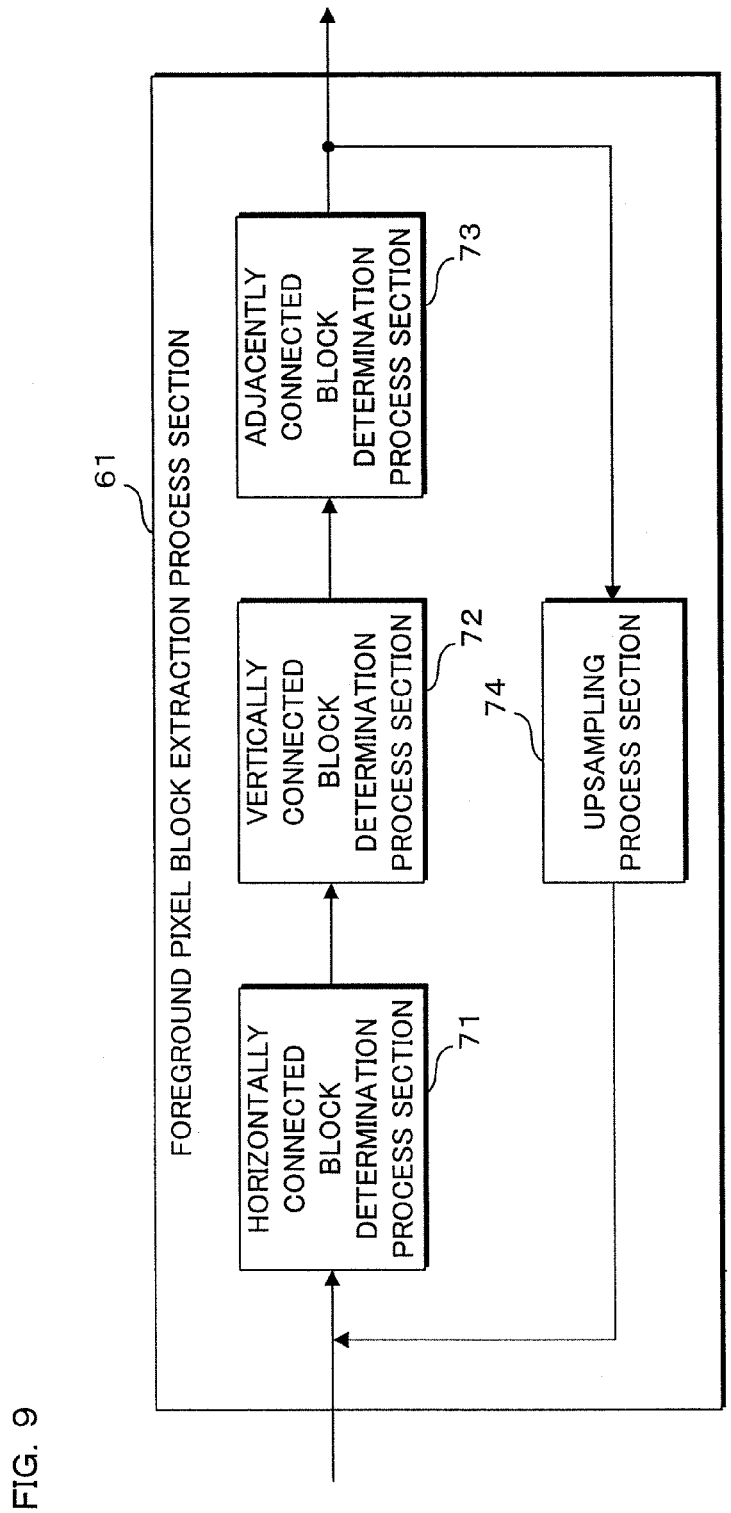
FIG. 9 is a block diagram that illustrates in detail the construction of a foreground pixel block extraction process section.

FIG. 8 is a block diagram that illustrates in detail the construction of the foreground mask generation process section 51 of the compression process section 30. The foreground mask generation process section 51 extracts foreground pixels from the input image data, and generates a foreground mask. The foreground mask generation process section 51 comprises a foreground pixel block extraction process section 61, labeling process section 62, foreground color calculation process section 63, foreground pixel extraction process section 64 and the like. Also, FIG. 9 is a block diagram that illustrates in detail the construction of the foreground pixel block extraction process section 61.

The foreground pixel block extraction process section 61 divides an image area related to the input image data into pixel blocks (image areas) having a predetermined size, and from a plurality of pixel blocks in the image data, classifies pixel blocks, whose difference in pixel value densities between pixels included in the pixel block are less than a predetermined value, as uniform density pixel blocks (uniform density areas). In addition, the foreground pixel block extraction process section 61 extracts foreground pixel blocks by classifying out pixel blocks other than uniform density pixel blocks as foreground pixel blocks (variable density areas). The foreground pixel block extraction process section 61 comprises a horizontally connected block determination process section 71, vertically connected block determination process section 72, adjacently connected block determination process section 73 and upsampling process section 74.

The foreground pixel block extraction process section 61 checks the pixel value of each pixel in a pixel block, calculates the difference between the maximum pixel value and minimum pixel value, and designates pixel blocks whose difference is less than a predetermined value as candidates to be uniform density pixel blocks (hereafter, referred to as uniform density pixel block candidates). The horizontally connected block determination process section 71 searches a plurality of uniform density pixel block candidates that are adjacent (continuous) in the horizontal direction of the image area related to the input image data, and calculates the number of connected uniform density pixel block candidates. When the calculated number of connected blocks exceeds a predetermined value, the horizontally connected block determination process section 71 determines that these connected uniform density pixel block candidates are uniform density pixel blocks.

Similarly, the vertically connected block determination process section 72 searches a plurality of uniform density pixel block candidates that are adjacent in the vertical direction of the image area related to the input image data, and calculates the number of adjacent uniform density pixel block candidates. When the calculated number of the adjacent uniform density pixel block candidates exceeds a predetermined value, the vertically connected block determination process section 72 determines that these adjacent uniform density pixel block candidates are uniform density pixel blocks.

The adjacently connected block determination process section 73 checks for each of the pixel blocks of the input image data whether or not the surrounding pixel blocks are uniform density pixel blocks or uniform density pixel block candidates, and determines that pixel blocks that surround a predetermined number or more of uniform density pixel blocks or uniform density pixel candidates are uniform density pixel blocks.

However, the foreground pixel block extraction process section 61 repeats the processes, for determining uniform density pixel blocks, that are performed by the horizontally connected block determination process section 71, vertically connected block determination process section 72 and adjacently connected block determination process section 73. For example, the foreground pixel block extraction process section 61 first divides the image area related to the input image data into pixel blocks having a size of 16 pixels×16 pixels (hereafter, referred to as a 16×16 pixel block), and by the horizontally connected block determination process section 71, vertically connected block determination process section 72 and adjacently connected block determination process section 73, determines whether or not each 16×16 pixel block is a uniform density pixel block.

After that, the foreground pixel block extraction process section 61 divides the 16×16 pixel blocks determined to be foreground pixel blocks into even smaller pixel blocks by the upsampling process section 74 and, for example, divides the 16×16 pixel blocks into pixel blocks that are 8 pixels×8 pixels (hereafter, referred to as a 8×8 pixel block). The foreground pixel block extraction process section 61 determines by the horizontally connected block determination process section 71, vertically connected block determination process section 72 and adjacently connected block determination process section 73 whether or not each 8×8 pixel block is a uniform density pixel block. In this way, the foreground pixel block extraction process section 61 repeats the division of the image area related to the input image data and the determination of uniform density pixel blocks until the size of the pixel blocks is a predetermined size. Finally in each determination process, the foreground pixel block extraction process section 61 classifies the pixel blocks that have been determined at least once to be uniform density pixel blocks as uniform density pixel blocks, and all other pixel blocks as foreground pixel blocks.

Figure 10:
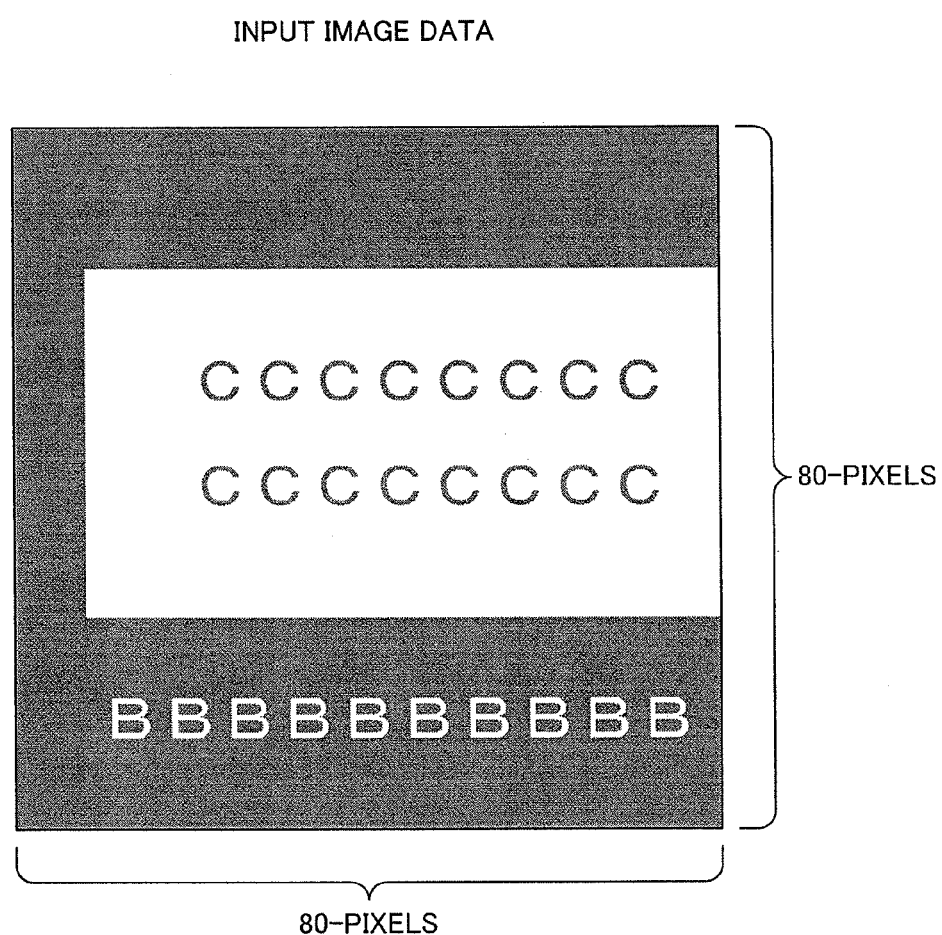
FIG. 10 is a schematic drawing for explaining a foreground pixel block extraction process that is performed by the foreground pixel block extraction section.

FIGS. 10, 11, 12, 13, 14, 15, 16, 17A, 17B, 17C, 17D, 18 and 19 are schematic drawings for explaining the foreground pixel block extraction process that is performed by the foreground pixel block extraction process section 61, and are of a time sequence of the foreground pixel block extraction process that is performed for the input image data. An example of the input image data of this example is given in FIG. 10. The input image data illustrated in the figure is an image having reverse text "BBB . . . " drawn in white at the bottom of a red (in the figure, this is expressed using grayscale) background image, and red text "CCC . . . " drawn on a local white background image in the center of the image, with the image size being 80 pixels×80 pixels.

Figure 11:
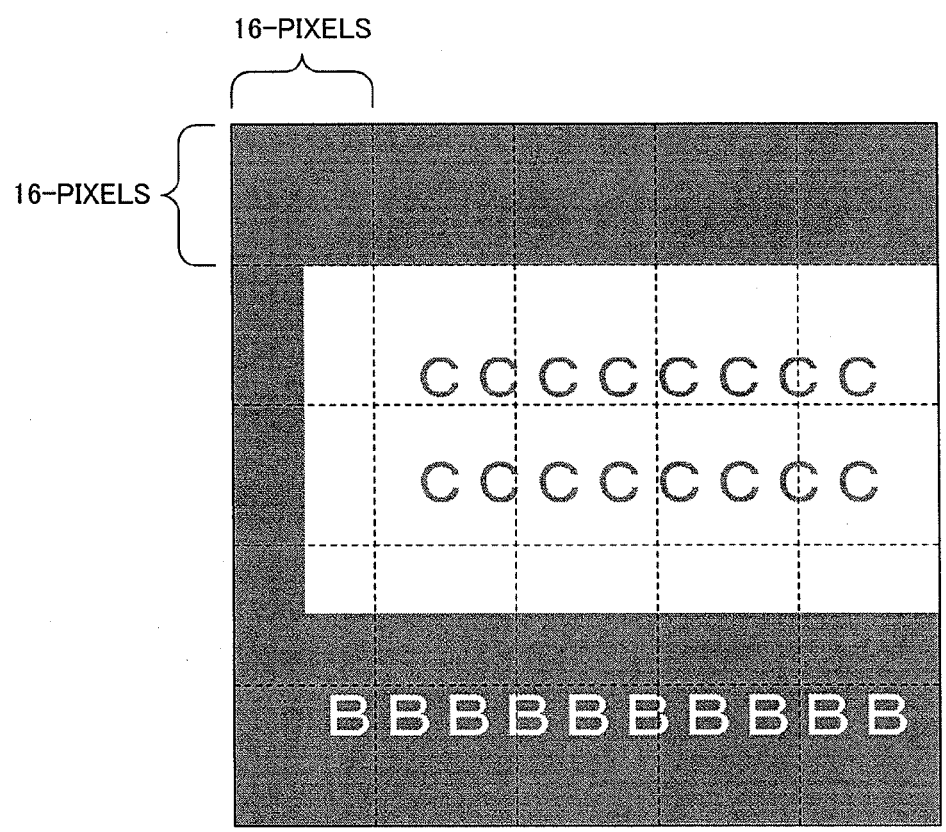
FIG. 11 is a schematic drawing for explaining a foreground pixel block extraction process that is performed by the foreground pixel block extraction section.

The foreground pixel block extraction process section 61 first divides the image area related to the input image data into 16×16 pixel blocks. The result of dividing the image area related to the input image data illustrated in FIG. 10 into 16×16 pixel blocks is shown in FIG. 11. By doing this, the 80 pixel×80 pixel image area related to the input image data is divided into 25 16×16 pixel blocks. The foreground pixel block extraction process section 61, by the horizontally connected block determination process section 71, vertically connected block determination process section 72 and adjacently connected block determination process section 73, determines whether or not each 16×16 pixel block is uniform density pixels. The determination results of the 16×16 pixel blocks illustrated in FIG. 11 are illustrated in FIG. 12. In FIG. 12, the pixel blocks determined to be uniform density pixel blocks and the pixel blocks determined to be foreground pixel blocks which are not the uniform density pixel blocks are indicated using different kind of hatching.

After the determination has been performed for all of the 16×16 pixel blocks, the foreground pixel block extraction process section 61, by the upsampling process section 74, divides each of the 16×16 pixel blocks into four blocks. The foreground pixel block extraction process section 61 divides the image area related to the input image data into 8×8 pixel blocks. The results of dividing the image area related to the input image data into 8×8 pixel blocks is illustrated in FIG. 13 (however, in FIG. 13, the pixel blocks that have already been determined to be uniform density pixel blocks have the same hatching as used in FIG. 12). By doing this, the 80 pixels×80 pixels input image data is divided into 100 8×8 pixel blocks. In FIG. 13, all of the 16×16 pixel blocks are divided into four blocks, to become 8×8 pixel blocks, however, it is also possible not to divide the 16×16 pixel blocks that have already been determined to be uniform density pixel blocks.

After the upsampling process is finished, the foreground pixel block extraction process section 61, by the horizontally connected block determination process section 71, determines whether or not each 8×8 pixel block is a uniform density pixel block. The determination results for the 8×8 pixel blocks illustrated in FIG. 13 are illustrated in FIG. 14. First, the horizontally connected block determination process section 71 calculates the difference between the maximum pixel value and minimum pixel value for each 8×8 pixel block, and designates 8×8 pixel blocks for which this difference is less than a predetermined as uniform density pixel block candidates. Next, the horizontally connected block determination process section 71 searches the plurality of uniform density pixel block candidates that are adjacent in the horizontal direction of the image area related to the input image data, and calculates the number of adjacent uniform density pixel block candidates. When the calculated number of adjacent uniform density pixel block candidates exceeds a predetermined value, the horizontally connected block determination process section 71 determines that these adjacent uniform density pixel block candidates are uniform density pixel blocks. When doing this, the horizontally connected block determination process section 71 does not need to perform determination for pixel blocks already determined in earlier processing to be uniform density pixel blocks. When searching for uniform density pixel block candidates that are adjacent in the horizontal direction, the horizontally connected block determination process section 71 may determine that only adjacent uniform density pixel block candidates for which the average pixel values are close (difference in average pixel values is within a predetermined range) to be adjacent uniform density pixel block candidates. This determination is performed in the illustrated example. Moreover, the illustrated example is for the case in which five or more uniform density pixel block candidates are adjacent, and the determination result when those uniform density pixel block candidates are determined to be uniform density pixel blocks.

Figure 15:
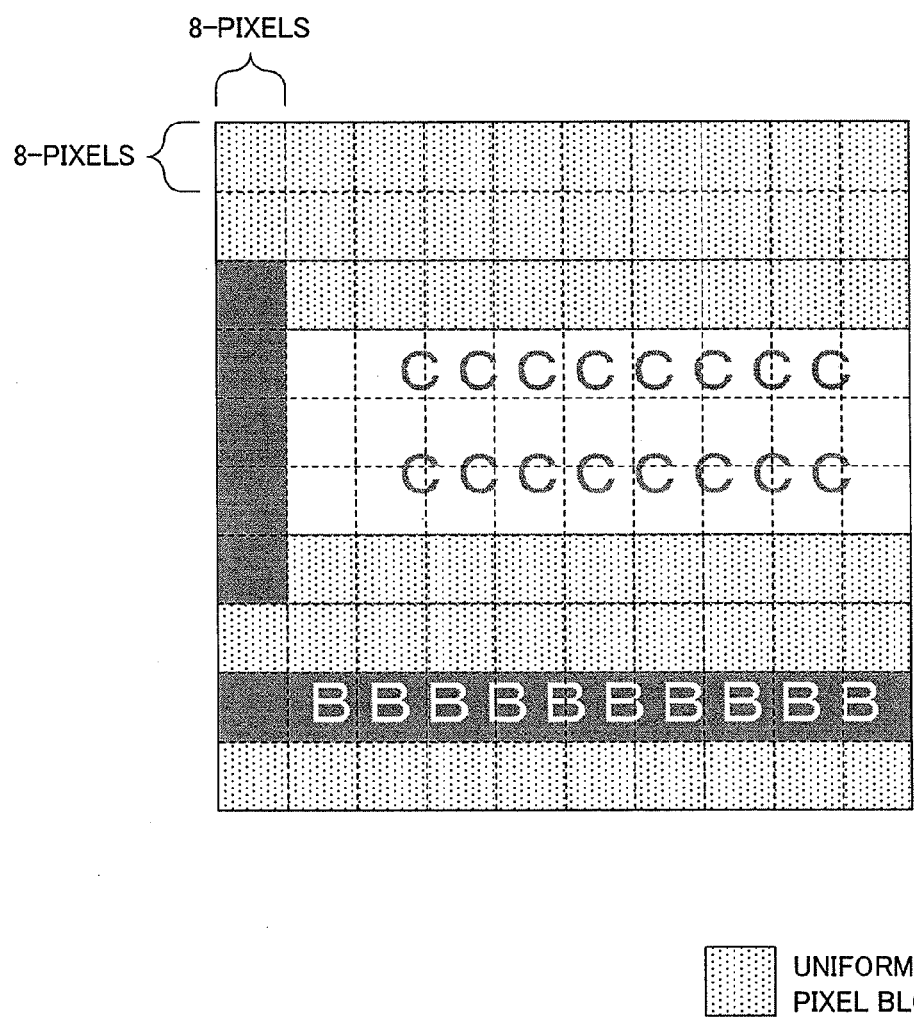
FIG. 15 is a schematic drawing for explaining a foreground pixel block extraction process that is performed by the foreground pixel block extraction section.
Figure 16:
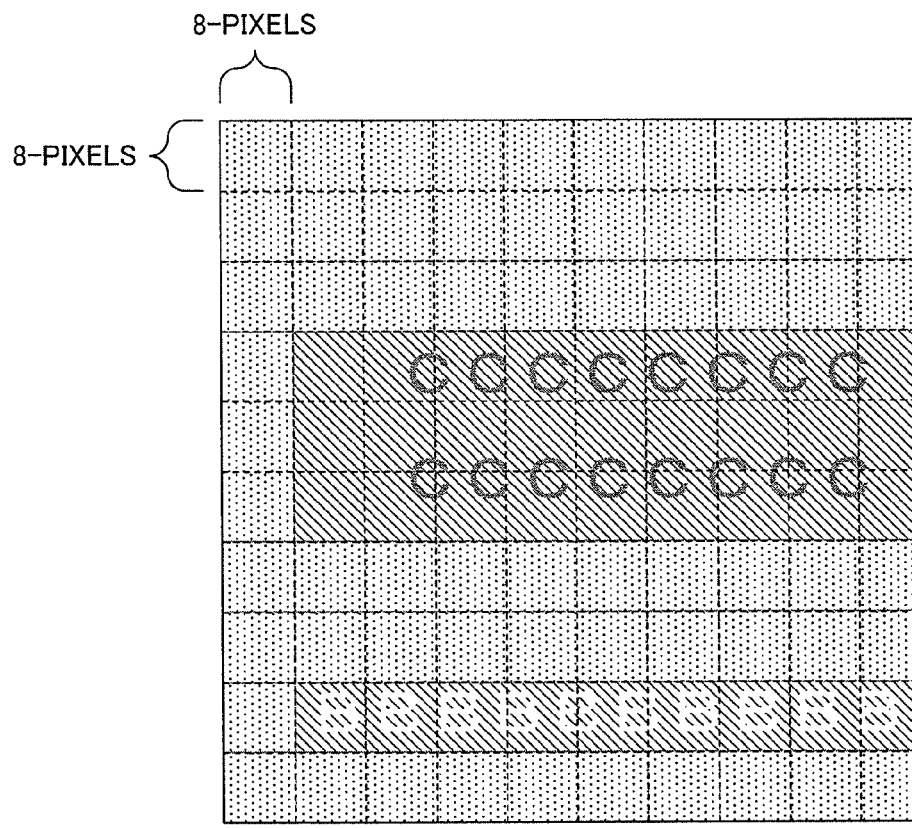
FIG. 16 is a schematic drawing for explaining a foreground pixel block extraction process that is performed by the foreground pixel block extraction section.

After the determination process by the horizontally connected block determination process section 71 has finished, the foreground pixel block extraction process section 61, by the vertically connected block determination process section 72, determines whether or not each 8×8 pixel block is a uniform density pixel block. FIG. 15 illustrates the case when the determination results given in FIG. 14 are reflected on the input image data, and the determination results by the vertically connected block determination process section 72 for the 8×8 pixel blocks of the input image data illustrated in FIG. 15 are illustrated in FIG. 16. The vertically connected block determination process section 72 designates uniform density pixel block candidates from the 8×8 pixel blocks of the input image data, then searches for a plurality of uniform density pixel block candidates that are adjacent in the vertical direction of the image area related to the input image data, and calculates the number of adjacent uniform density pixel block candidates. When the calculated number of adjacent uniform density pixel block candidates exceeds a predetermined value, the vertically connected block determination process section 72 determines that these adjacent uniform density pixel block candidates are uniform density pixel blocks. When doing this, the vertically connected block determination process section 72 does not need to perform the determination for pixel blocks already determined in earlier processing to be uniform density pixel blocks. When searching for uniform density pixel block candidates that are adjacent in the vertical direction, the vertically connected block determination process section 72 may determine only adjacent uniform density pixel block candidates for which the average pixel values or the like are close to be adjacent uniform density pixel block candidates. This determination is performed in the illustrated example. Moreover, the illustrated example is for the case in which five or more uniform density pixel block candidates are adjacent, and the determination result when those uniform density pixel block candidates are determined to be uniform density pixel blocks.

After the determination process by the vertically connected block determination process section 72 has finished, the foreground pixel block extraction process section 61, by the adjacently connected block determination process section 73, determines whether or not the 8×8 pixel blocks are uniform density pixel blocks. First, the adjacently connected block determination process section 73 designates uniform density pixel block candidates from the 8×8 pixel blocks of the input image data. Next, the adjacently connected block determination process section 73 takes one 8×8 pixel block to be a target pixel block, and checks whether or not the other 8×8 pixel blocks surrounding that target pixel block are uniform density pixel blocks or uniform density pixel block candidates, then calculates the number of surrounding uniform density pixel blocks and uniform density pixel block candidates as the number of adjacent uniform density pixel blocks. The adjacently connected block determination process section 73 performs these processes on all of the 8×8 pixel blocks. However, the adjacently connected block determination process section 73 does not need to perform the processes on a pixel block that has already been determined in a previous process to be a uniform density pixel block.

The range in which the adjacently connected block determination process section 73 checks whether or not pixel blocks are uniform density pixel blocks or uniform density pixel block candidates is illustrated in FIGS. 17A, 17B, 17C and 17D. In FIGS. 17A, 17B, 17C and 17D, hatching is given to the target pixel block, and arrows indicate the surrounding pixel blocks that will be checked whether or not they are uniform density pixel blocks or uniform density pixel block candidates with respect to the target pixel block. For example, when the upsampling process section 74 divides a pixel block in four as in a 16×16 pixel block and 8×8 pixel block, the pixel blocks that surround the target pixel block used in determination by the adjacently connected block determination process section 73, could be one of four kinds as illustrated in FIGS. 17A, 17B, 17C and 17D.

Figure 17A:
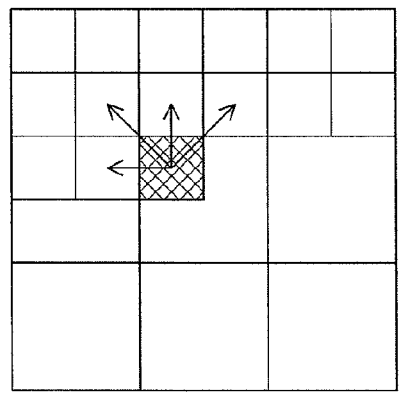
FIGS. 17A, 17B, 17C and 17D are schematic drawings for explaining a foreground pixel block extraction process that is performed by the foreground pixel block extraction section.

When the target pixel block is an 8×8 pixel block located in the upper left of a 16×16 pixel block, the adjacently connected block determination process section 73 checks whether or not the three 8×8×8 pixel blocks above and the one 8×8 pixel block on the left side (four pixel blocks that have already been processed) of the target pixel block are uniform density pixel blocks, and calculates the number of the uniform density pixel blocks (see FIG. 17A).

Figure 17B:
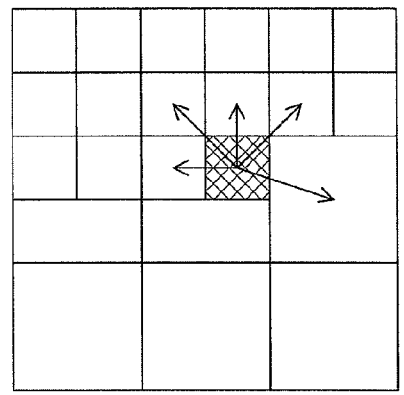

When the target pixel block is an 8×8 pixel block located in the upper right of a 16×16 pixel block, the adjacently connected block determination process section 73 checks whether or not the three 8×8 pixel blocks above and the one 8×8 pixel block on the left side (four pixel blocks that have already been processed) of the target pixel block, and the 16×16 pixel block on the right side of the target pixel block (five pixel blocks) are uniform density pixel blocks, and calculates the number of the uniform density pixel blocks (see FIG. 17B).

When the target pixel block is an 8×8 pixel block located in the lower left of a 16×16 pixel block, the adjacently connected block determination process section 73 checks whether or not the three 8×8 pixel blocks above and the one 8×8 pixel block on the left side of the target pixel block (four pixel blocks that have already been processed), and the two 16×16 pixel blocks on lower left side and below the target pixel block (six pixel blocks) are uniform density pixel blocks, and calculates the number of the uniform density pixel blocks (see FIG. 17C).

When the target pixel block is an 8×8 pixel block located in the lower right of a 16×16 pixel block, the adjacently connected block determination process section 73 checks whether or not the three 8×8 pixel blocks above and the one 8×8 pixel block on the left side of the target pixel block (four pixel blocks that have already been processed), and the two 16×16 pixel blocks on lower right side and below the target pixel block (six pixel blocks) are uniform density pixel blocks, and calculates the number of the uniform density pixel blocks (see FIG. 17D).

Figure 17C:
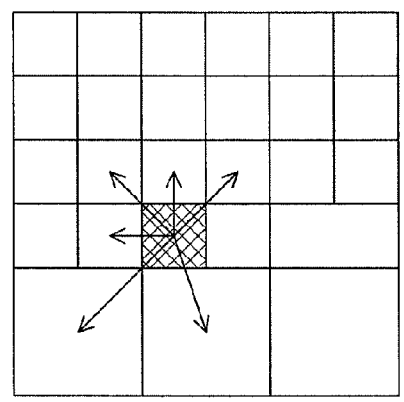
Figure 17D:
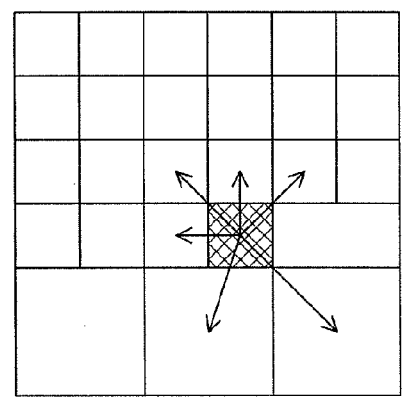

When the foreground pixel block extraction process section 61 starts processing the input image data (in other words, when the upsampling process section 74 has not divided the image area related to the input image data), as illustrated in FIGS. 17B, 17C and 17D, when the adjacently connected block determination process section 73 requires the previous process results for the 16×16 pixel blocks, instead of these results, the adjacently connected block determination process section 73 determines whether or not the corresponding pixel blocks are uniform density pixel block candidates. When a pixel block is a uniform density pixel block candidate, the adjacently connected block determination process section 73 may handle that pixel block as a uniform density pixel block.

Figure 19:
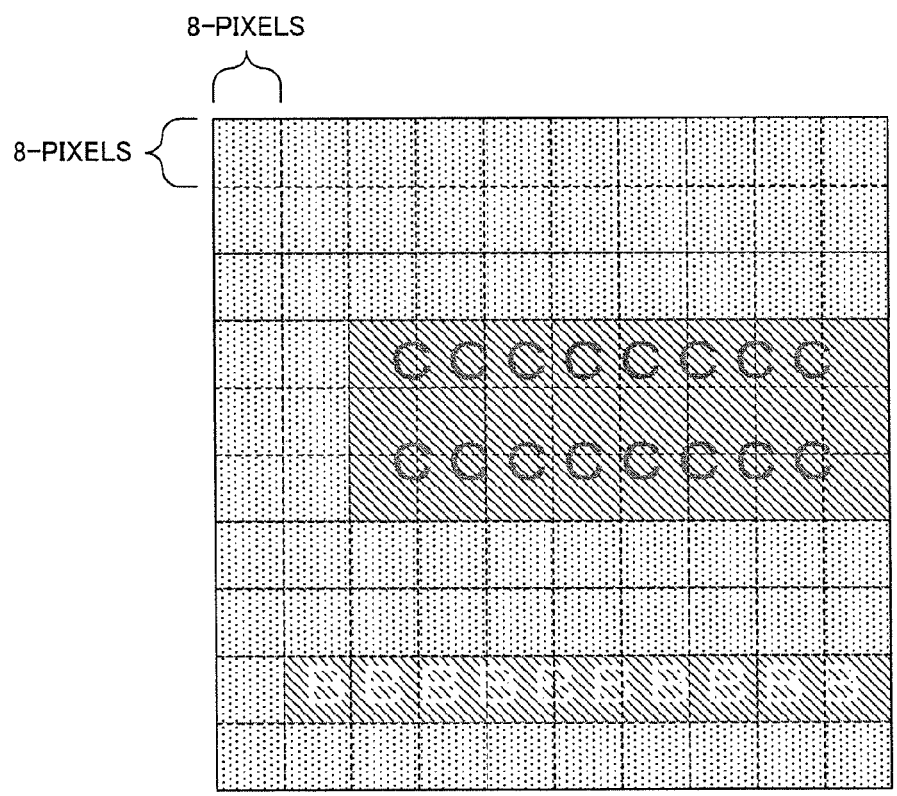
FIG. 19 is a schematic drawing for explaining a foreground pixel block extraction process that is performed by the foreground pixel block extraction section.

By performing the determination described above for all of the 8×8 pixel blocks, the adjacently connected block determination process section 73 determines whether or not each 8×8 pixel block of the input image data is a uniform density pixel block. The result of reflecting the determination results from the vertically connected block determination process section 72 illustrated in FIG. 16 on the input image data is illustrated in FIG. 18, and the result of the adjacently connected block determination process section 73 performing determination of the 8×8 pixel blocks of the input image data illustrated in FIG. 18 is illustrated in FIG. 19. The illustrated example is for the case in which four or more of the uniform density pixel blocks surrounding a target block are adjacent, and illustrates the determination result when that target block is determined to be a uniform density pixel block.

As described above, the foreground pixel block extraction process section 61 repeats the determination processes by the horizontally connected block determination process section 71, vertically connected block determination process section 72 and adjacently connected block determination process section 73 while dividing the pixel blocks by the upsampling process section 74 until the size of the pixel blocks is a predetermined size. When the size of the pixel blocks reaches a predetermined size, the foreground pixel block extraction process section 61, through the repeated determination processes, separates the pixel blocks determined to be uniform density pixel blocks and the other blocks as uniform density pixel blocks and foreground pixel blocks respectively, and extracts the foreground pixel blocks. The foreground pixel block extraction process section 61 outputs the processing result to the labeling process section 62 and foreground color calculation process section 63.

Figure 21:
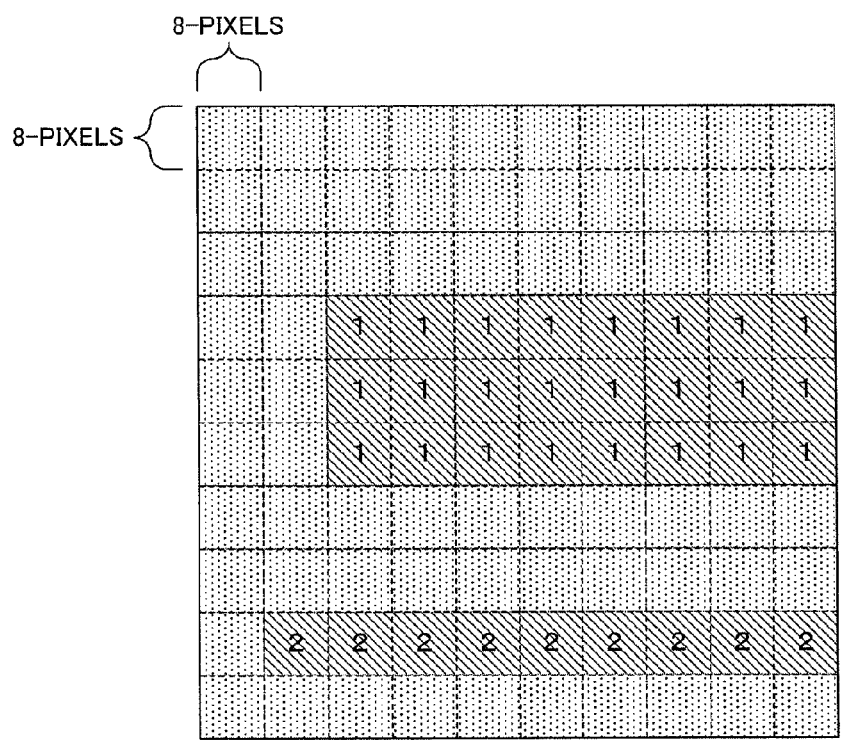
FIG. 21 is a schematic drawing for explaining a labeling process that is performed by the labeling section.

The labeling process section 62 gives the same label to adjacent foreground blocks of the foreground blocks extracted by the foreground pixel block extraction process section 61. The labeling process section 62 extracts areas of continuous foreground pixel blocks (hereafter, referred to as simply foreground pixel areas). FIGS. 20A, 20B and 21 are schematic drawings for explaining the labeling process that is performed by the labeling process section 62. For example, in FIG. 20A, in the hatched foreground pixel blocks two kinds of labels, '1' and '2' are given as illustrated in FIG. 20B and two foreground pixel areas are extracted.

More specifically, the labeling process section 62 selects one foreground pixel block from the input image data as a target pixel block, and references the eight pixel blocks that surround that target pixel block. When there is already a pixel block to which a label has been given, the labeling process section 62 obtains the label with the minimum values and gives that label to the target pixel block. When there are no labels given to the surrounding eight pixel blocks, the labeling process section 62 gives a new label to the target pixel block. In addition, when a plurality of labels having different values are given to the eight pixel blocks that surround the target pixel block, the labeling process section 62 consolidates the labels by giving the label having the minimum value to the pixel blocks to which different labels are given. Two kinds of labels illustrated in FIG. 20B are given to the foreground pixel blocks of FIG. 20A. Similarly, the labeling process section 62 gives two kinds of labels, '1' and '2', to the process results from the foreground pixel block extraction process section 61 in FIG. 19, and extracts two foreground pixel areas from the input image data as illustrated in FIG. 21. The process results from the labeling process section 62 are outputted to the foreground pixel extraction process section 64.

Figure 22:
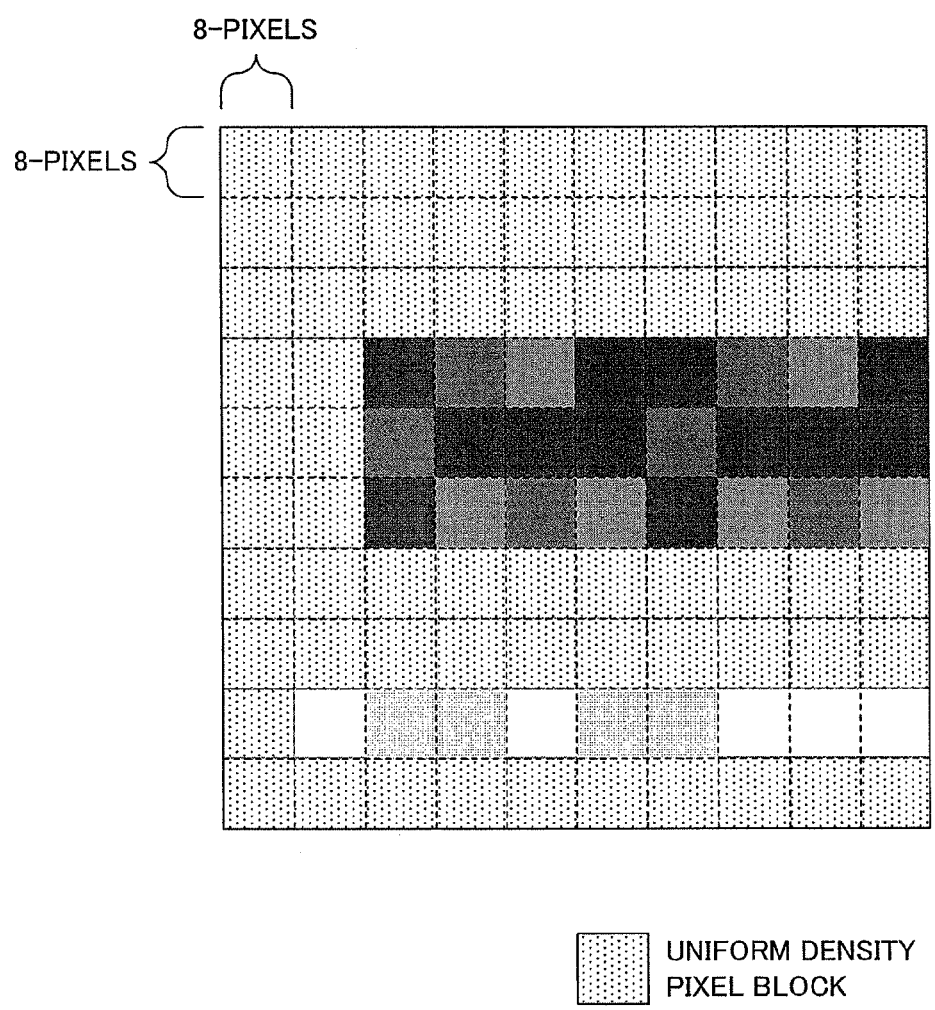
FIG. 22 is a schematic drawing for explaining a foreground color calculation process that is performed by a foreground color calculation section.

The foreground color calculation process section 63 calculates the foreground color for each foreground pixel block extracted by the foreground pixel block extraction process section 61. FIG. 22 is a schematic drawing for explaining the foreground color calculation process that is performed by the foreground color calculation process section 63. The foreground color calculation process section 63 designates one foreground pixel block to be a target pixel block, and calculates the average value of the pixel values for the uniform density pixel blocks that surround (are adjacent to) the target pixel block, then by making comparisons with this average value, calculates the pixel value of the pixel inside the target pixel block with the greatest difference as the foreground color. The foreground color calculation process section 63 calculates the foreground color for all of the foreground pixel blocks of the input image data. When there are no uniform density pixels surrounding the target pixel block, or in other words, when there are only foreground pixel blocks surrounding the target pixel block, the foreground color calculation process section 63 may take the foreground color of an adjacent foreground pixel block to be the foreground color of the target pixel block. Moreover, in that case, the foreground color calculation process section 63 may determine that it is not possible to calculate the foreground color for that target pixel block. For example, for the process results by the foreground pixel block extraction process section 61 in FIG. 19, the foreground color calculation process section 63 calculates the foreground color as illustrated in FIG. 22. The calculation results from the foreground color calculation process section 63 are outputted to the foreground pixel extraction process section 64.

Figure 23:
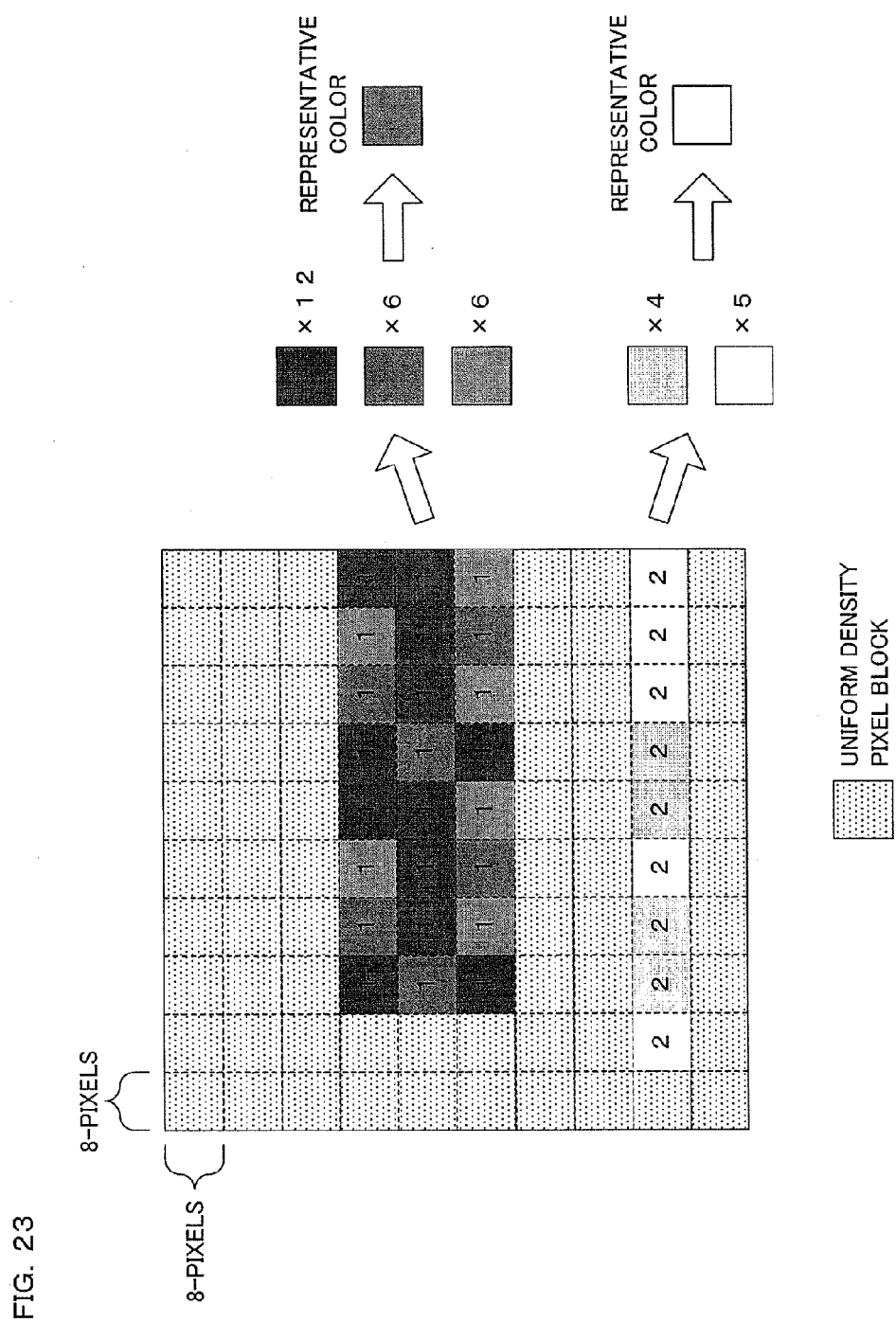
FIG. 23 is a schematic drawing for explaining a foreground pixel extraction process that is performed by a foreground pixel extraction section.
Figure 24:
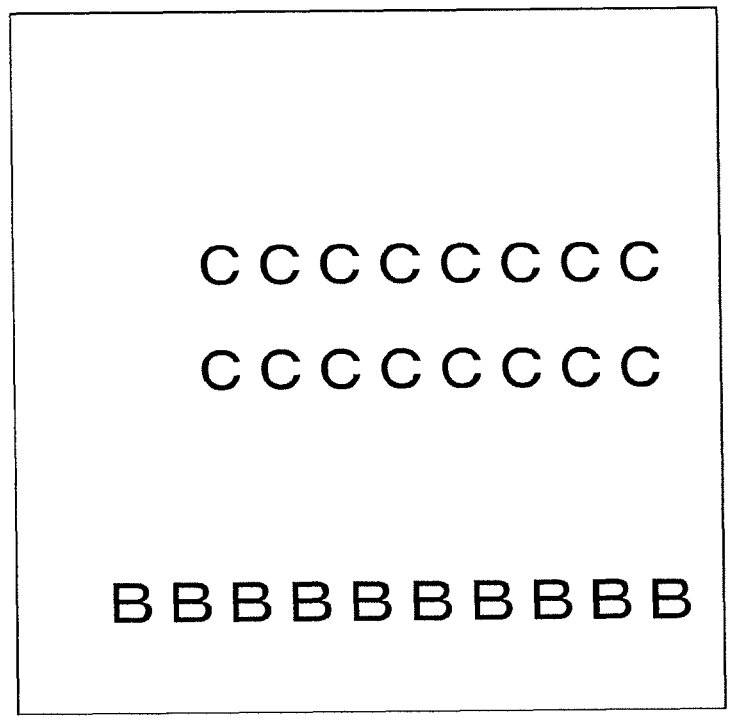
FIG. 24 is a schematic drawing for explaining a foreground pixel extraction process that is performed by the foreground pixel extraction section.

The foreground pixel extraction process section 64 receives the process results from the labeling process section 62 in which the same label was given to each foreground pixel area, and the foreground colors calculated for each foreground pixel block from the foreground color calculation process section 63. FIGS. 23 and 24 are schematic drawings for explaining the foreground pixel extraction process that is performed by the foreground pixel extraction process section 64. First, the foreground pixel extraction process section 64 designates a representative color for the foreground colors for each foreground pixel area to which the same label is given. In the example of FIG. 23, the foreground pixel area to which the label '1' is given includes 24 foreground pixel blocks, and three colors are calculated as the foreground color. The foreground pixel extraction process section 64 designates the foreground color used most frequently of the three foreground colors as the representative color for the foreground pixel area to which the label '1' is given. Moreover, the foreground pixel area to which the label '2' is given includes nine foreground pixel blocks, and two colors are calculated as the foreground color. The foreground pixel extraction process section 64 designates the foreground color used most frequently of the two foreground colors as the representative color for the foreground pixel area to which the label '2' is given.

After calculating the representative colors, the foreground pixel extraction process section 64 compares each pixel included in a foreground pixel area with the representative color for that foreground pixel area, and extracts the pixels whose colors are close to that representative color (or in other words, colors for which the differences between the pixel values of the representative color and the pixels is within a predetermined range) as foreground pixels. The results of extracting foreground pixels from the input image data of FIG. 10 based on the foreground pixel areas and representative colors in FIG. 23 are illustrated in FIG. 24. In FIG. 24, the reverse text 'BBB . . . ' and the text 'CCC . . . ' drawn on a localized background image are both extracted as foreground pixels.

When designating a representative color from a foreground pixel area, in the example of FIG. 23, the most frequently used foreground color is taken to be the representative color, however, the representative color is not limited to this. For example, the foreground pixel extraction process section 64 may calculate the average value of a plurality of foreground colors included in a foreground pixel area, and take the average color to be the representative color. Also, for example, it is possible to eliminate foreground colors that have a low frequency of appearance in a foreground pixel area from candidates of the representative color when designating the representative color. In addition, when the size (for example, the number of foreground pixel blocks) of a foreground pixel area is less than a predetermined size, that foreground pixel area may be eliminated from areas for extracting foreground pixels.

The foreground mask generation process section 51 outputs the foreground pixels extracted by the foreground pixel extraction process section 64 as a foreground mask. As described above, the foreground mask is outputted to the foreground color index process section 52 together with the input image data. Moreover, the input image data is separated into a background layer and foreground layer by the foreground color index process section 52, background layer generation process section 53 and the binary image generation process section 54 performing their respective image processing based on the foreground mask information. The background layer and foreground layer are both compressed by the image compressing section 55.

When the foreground mask generation process section 51 of the compression process section 30 of the image processing apparatus 20 extracts foreground pixels, an MFP constructed as described above, divides the image area related to the input image data into a plurality of pixel blocks (image areas) and classifies each of the pixel blocks into uniform density pixel blocks (uniform density areas) or foreground pixel blocks (variable density areas). The foreground pixel block extraction process section 61 extracts foreground pixel blocks. The foreground color calculation process section 63 of the foreground mask generation process section 51 calculates the foreground colors from the extracted foreground pixel blocks as color information. The labeling process section 62, by giving the same label to a plurality of adjacent foreground pixel blocks, extracts areas of continuous foreground pixel blocks as foreground pixel areas (continuous variable density areas). Then, from these processing results, the foreground pixel extraction process section 64 calculates representative colors for each foreground pixel area, and extracts pixels having pixel values close to a representative color as foreground pixels.

From these processes, even when the image related to the input image data is an image that includes reverse text, or is an image having a complicated layout such as an image having localized background colors, the image processing apparatus 20 can extract foreground pixels from the input image data with good accuracy, and can separate the input image data into a foreground layer and background layer with good accuracy. The image processing apparatus 20 can compress the input image data using a suitable compression method. Therefore, it is possible to improve the ratio of the compression of the input image data performed by the image processing apparatus 20.

Moreover, when calculating the foreground colors from the foreground pixel blocks, by calculating the pixel value of a pixel having the largest difference from the average pixel value of uniform density pixel blocks that surround a foreground pixel block as a foreground color, the foreground color calculation process section 63 can calculate the foreground colors with good accuracy even for reverse text in which the relationship between the lightness of the page background and the lightness of the text is reversed. The foreground color calculation process section 63 can extract foreground pixels with good accuracy.

Furthermore, the foreground pixel block extraction process section 61 extracts uniform density pixel block candidates (image areas where there is little change in pixel values) from the input image data and calculates the number of adjacent uniform density pixel block candidates when there are adjacent uniform density pixel block candidates in a predetermined direction such as the horizontal direction and vertical direction of the image area related to the input image data. The foreground pixel block extraction process section 61 classifies the image area related to the input image data into uniform density pixel blocks or foreground pixel blocks by determining that when the calculated number of adjacent uniform density pixel block candidates exceeds a predetermined value, the adjacent uniform density pixel block candidates are uniform density pixel blocks. It is possible to designate pixel blocks, whose pixels values change very little over a wide area, to be uniform density pixel blocks, and to extract uniform density pixel blocks on the basis of information for a plurality of surrounding pixel blocks and not just that of information for one pixel block. Therefore, the foreground pixel block extraction process section 61 can extract uniform density pixel areas with good accuracy.

In addition, when calculating the number of adjacent uniform density pixel block candidates, the foreground pixel block extraction process section 61 does not add pixel blocks, whose difference in average pixel values are beyond a predetermined range, to the calculated number of adjacent uniform density pixel block candidates even though the pixel blocks are adjacent uniform density pixel block candidates, and adds only uniform density pixel block candidates, whose difference in average pixel values is within a predetermined range, to the calculated number of adjacent uniform density pixel block candidates. Even when uniform density pixel block candidates are adjacent, when the difference in average pixel values is large, it is likely that the uniform density pixel block candidates are not uniform density areas. By eliminating these kinds of uniform density pixel block candidates from the calculation of the number of adjacent uniform density pixel block candidates, the foreground pixel block extraction process section 61 can prevent a drop in accuracy in the extraction of uniform density pixel blocks.

Moreover, the foreground pixel block extraction process section 61 divides the image area related to the input image data into pixel blocks having a predetermined size, and determines whether or not the divided pixel blocks are uniform density pixel blocks. After that, the foreground pixel block extraction process section 61, by the upsampling process section 74, further divides the image blocks into a smaller size, and similarly determines whether or not the divided small sized pixel blocks are uniform density pixel blocks. By repeating the division of pixel blocks and the determination of uniform density pixel blocks until the size of the pixel blocks is a predetermined size, the foreground pixel block extraction process section 61 can classify the input image data into uniform density pixel blocks and foreground pixel blocks with good accuracy even though the input image data has a complex layout having a plurality of localized background images.

In this embodiment, the case where the image processing apparatus 20 is included in an MFP was explained as an example. The example explained in this embodiment is not limited to this. Similar construction may also be applied to an image reading apparatus such as a flat head scanner (refer to the variation described later). Moreover, similar construction may also be applied to other apparatuses which perform a compression process of images. Also, the MFP of this embodiment handled color image data. However, the image data is not limited to this. The MFP of this embodiment may handle black and white image data.

Furthermore, the foreground pixel block extraction process section 61 performed processing in the order of the horizontally connected block determination process section 71, vertically connected block determination process section 72 and adjacently connected block determination process section 73, however, the order is not limited to this. The processing by each of these sections may be performed in any order, and furthermore may be performed in parallel. Moreover, the horizontally connected block determination process section 71, the vertically connected block determination process section 72 and adjacently connected block determination process section 73 calculate the number of adjacent uniform density pixel block candidates, and compares the calculated number with a predetermined value. When doing this, the predetermined value that is used for the comparison can be increased or decreased according to the size of the pixel blocks. For example, the predetermined value for the comparison may be increased as the size of the pixel blocks becomes smaller.

(Variation)

Figure 25:
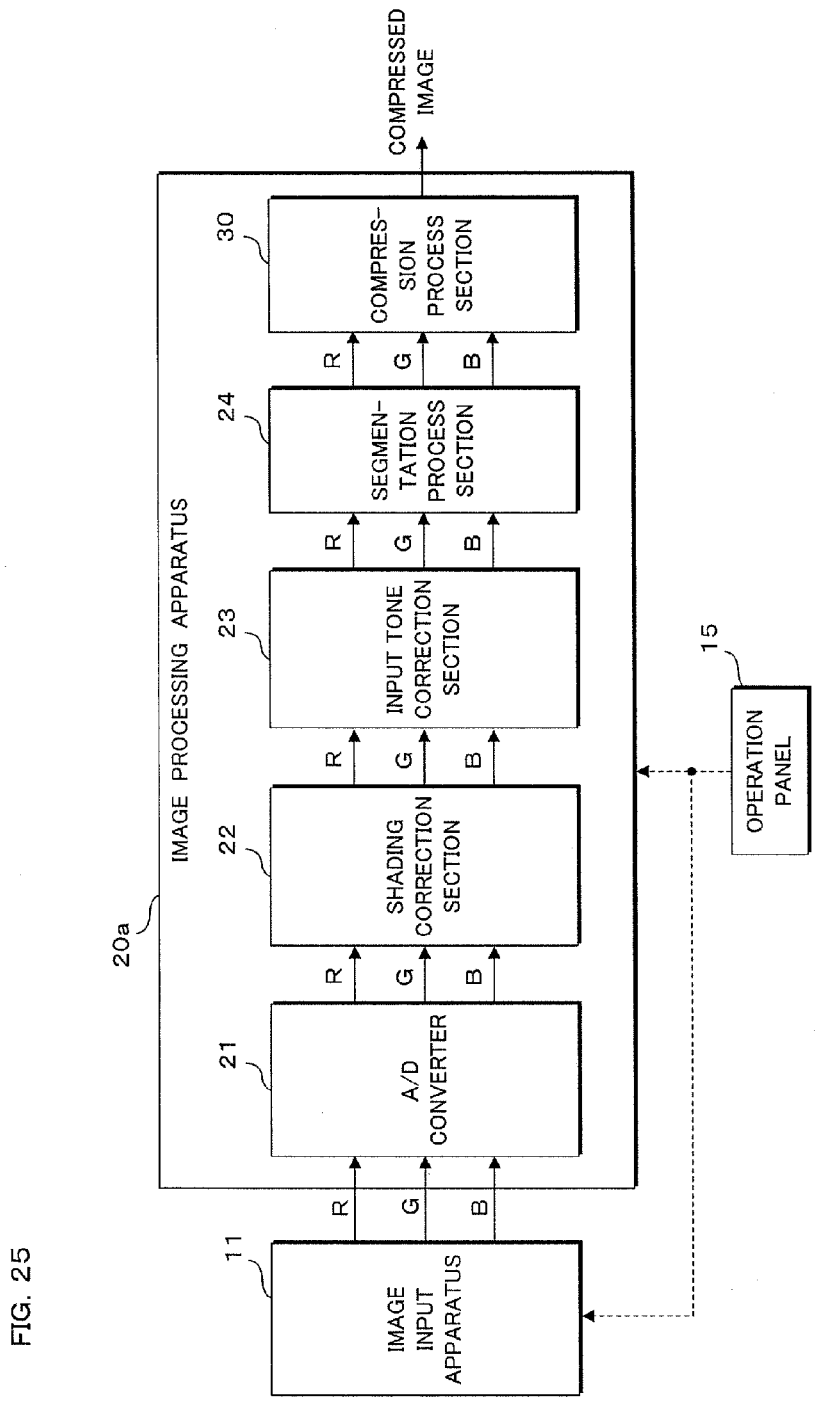
FIG. 25 is a block diagram of the construction of an image reading apparatus of a variation of Embodiment 1.

FIG. 25 is a block diagram of the construction of an image reading apparatus of a variation of Embodiment 1. In the embodiment described above, an example of applying the invention to an MFP was explained, however the application of the invention is not limited to an MFP. The present invention may also be applied to an image reading apparatus. The image reading apparatus of this variation comprises an image input apparatus 11, an operation panel 15, an image processing apparatus 20a and the like.

The operation panel 15 comprises various keys for receiving operations from a user, and a display for displaying warning messages and the like. The image input apparatus 11 has a light source for irradiating light on a document, and a light receiving section provided with an array of image sensors such as CCDs, and the like. The image input apparatus 11 irradiates light on a document from the light source, and moves the light receiving section in one direction, separates the light reflected from the document into the three color components R (red), G (green) and B (blue), reads the separated reflected light in the light receiving section, and outputs the read image data to the image processing apparatus 20a as an RGB analog signal. The image input apparatus 11 may also be an apparatus such as a digital camera.

The image processing apparatus 20a comprises an A/D converter 21, a shading correction section 22, input tone correction section 23, segmentation process section 24 and compression process section 30. The image processing apparatus 20a, by the A/D converter 21 to segmentation process section 24, performs image processing of the input image data read by the image input apparatus 11, and by compression process section 30, compresses the image data and outputs the compressed image data. As in the case of the MFP of Embodiment 1, the compression process section 30 separates the input image data into a foreground layer and background layer, and compresses each layer using a suitable compression method. The compressed image data is recorded on a memory device such as a hard disk. For example, when an instruction to send the image data as electronic mail is given from the operation panel 15, the compressed image data is attached to electronic mail and sent to an inputted destination by a network card (not shown in the figure) or the like.

The other construction of the image reading apparatus of this variation is the same as the construction of the MFP of Embodiment 1, so the same reference numbers are given to identical parts, and detailed explanations of the identical part are omitted.

Not only can the image processing of the present invention be achieved through the use of hardware such as an MFP or image reading apparatus, it can also be achieved by a computer program that causes a computer to execute the image processing. The program code (executable format program, intermediate code program, source program, etc.) of this computer program is recorded on a recording medium that can be read by the computer. In this way, the recording medium on which the computer program for performing the foreground pixel extraction process, compression process and the like of the present invention is recorded can be carried and freely provided.

In the case where an apparatus such as the MFP of Embodiment 1 and the image reading apparatus of the variation described above comprises a memory section such as ROM (Read Only Memory) or a hard disk, the program code of this computer program may be recorded in that memory section. In addition, these apparatuses can comprise an apparatus in which a recording medium can be mounted or removed and that is capable of reading program code, and may perform image processing by executing the computer program read from the recording medium. In these cases, the computer program recorded on the memory section, the recording medium or the like may be directly read and executed by a CPU of an apparatus such as an MFP or image reading apparatus. It is also possible to download the program code from a memory section or recording medium to a memory area such as RAM (Random Access Memory), and to cause a CPU to execute that program code (it is assumed that a computer program for downloading program code is installed in the apparatus itself beforehand).

A recording medium that can be mounted in or removed from a apparatus such as an MFP or image reading apparatus may be a medium that fixedly holds the computer program such as a tape medium, magnetic disc medium, optical disc medium, card medium, semiconductor memory medium, or the like. A tape medium is a magnetic tape, cassette tape or the like. A magnetic disc medium is a flexible disc, hard disc or the like. An optical disc medium is a CD (Compact Disc), MO (Magneto-Optical), MD (Mini Disc), DVD (Digital Versatile Disk) or the like. A card medium is an IC (Integrated Circuit) card, memory card, optical card or the like. A semiconductor memory medium could be a mask ROM, EPROM (Erasable Programmable ROM), EEPROM (Electrically Erasable Programmable ROM), flash memory or the like. The image processing described above is performed by mounting the recording medium into an apparatus such as an MFP or image reading apparatus, and reading the computer program recorded on the recording medium, and executing the read computer program.

In addition, when it is possible to connect an apparatus such as an MFP or image reading apparatus to a communication network such as the Internet and to perform transmission and reception of data, that apparatus may perform image processing by downloading the computer program via the communication network and executing the downloaded computer program. In that case, a computer program for downloading a computer program for image processing via a communication network may be included in the apparatus itself beforehand, or may be installed via a recording medium or the like. The present invention may also be achieved in the form of a computer data signal. In a carrier wave of the computer data signal realized by an electronic transmission the program code of the aforementioned computer program is embedded.

Furthermore, the computer that executes these computer programs may comprise: an image input apparatus, a processing apparatus that perform various processing such as image processing by executing the computer programs, an image display apparatus that displays processing results, and an image output apparatus that outputs the image processing results to a medium such as paper. The image input apparatus is a flat head scanner, film scanner, digital camera or the like. The image display apparatus is a CRT (Cathode Ray Tube) display, liquid-crystal display or the like. The image output apparatus is a printer or the like. In addition, the computer that executes the computer programs described above may further comprise a communications section such as a network card or modem for connecting to a communication network.

(Embodiment 2)

Figure 26:
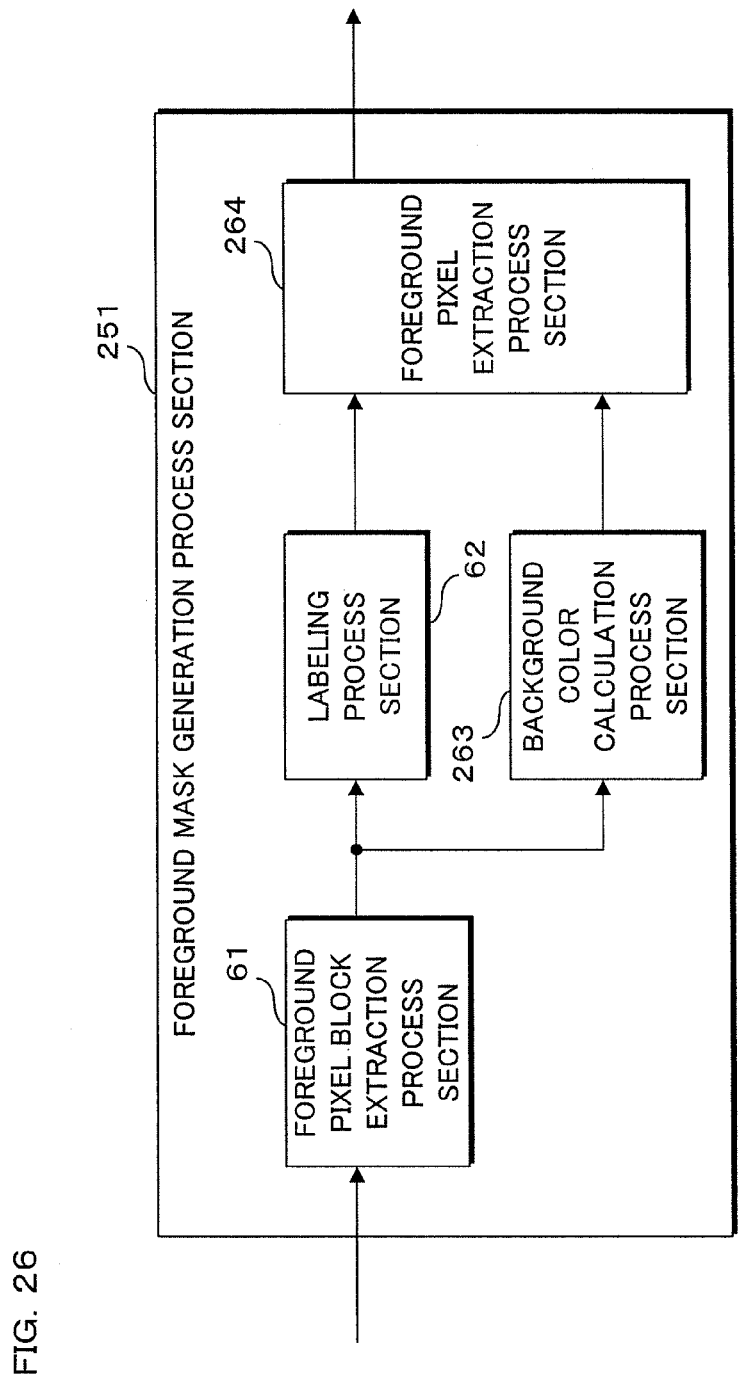
FIG. 26 is a block diagram of the construction of a foreground mask generation section of Embodiment 2.

FIG. 26 is a block diagram of the construction of a foreground mask generation process section 251 of Embodiment 2. Instead of the foreground color calculation process section 63 of the foreground mask generation process section 51 of Embodiment 1, the foreground mask generation process section 251 of Embodiment 2 comprises a background color calculation process section 263 that calculates the background color of foreground pixel blocks. The foreground pixel block extraction process section 61 of the foreground mask generation process section 251, as described above, divides an image area related to the input image data into a plurality of pixel blocks, and classifies each of the pixel blocks into uniform density pixel blocks or foreground pixel blocks. The foreground pixel block extraction process section 61 of the foreground mask generation process section 251 extracts foreground pixel blocks. In addition, the labeling process section 62, by giving the same labels to a plurality of adjacent foreground pixel blocks, extracts continuous foreground pixel block areas as foreground pixel areas.

The background color calculation process section 263 calculates the background color for each of the foreground pixel blocks exacted by the foreground pixel block extraction process section 61. The background color calculation process section 263 designates one foreground pixel block as a target pixel block, then averages the pixel values of the uniform density pixel blocks that surround (are adjacent to) the target pixel block, and calculates the averaged value as the background color of the foreground pixel block. The background color calculation process section 263 calculates the background colors for all of the foreground pixel blocks of the input image data. When there are no uniform density pixel blocks surrounding the target pixel block, or in other words, when the pixel blocks surrounding the target pixel block are only foreground pixel blocks, the background color calculation process section 263 may take the background color of the adjacent foreground pixel blocks to be background color of the target pixel block. Also, in this case, the background color calculation process section 263 may determine that it is not possible to calculate the background color for that target pixel block. The calculation results from the background color calculation process section 263 are outputted to the foreground pixel extraction process section 264.

The foreground pixel extraction process section 264 calculates a representative color for the background colors calculated by the background color calculation process section 263 for each of the foreground pixel areas extracted by the labeling process section 62, and extracts pixels, whose difference between the pixel value thereof and the representative color exceeds a threshold value, as foreground pixels. The calculation of the representative color of the background colors, similar to the calculation of the representative color of the foreground colors illustrated in FIG. 23, may be performed on the basis of the frequency of usage of the background color of the foreground pixel blocks included in a foreground pixel area. The representative color may also be calculated by using the average value of background colors that have similar density.

The foreground mask generation process section 251, having the construction described above, calculates the background color of foreground pixel blocks extracted from the input image data, and extracts foreground pixels. The foreground mask generation process section 251 can execute the same processing as the foreground mask generation process section 51 of Embodiment 1 that extracts foreground pixels on the basis of foreground color. In other words, the foreground mask generation process section 251 can extract foreground pixels from input image data with good accuracy even in the case where the image related to the input image data is an image of having a complex layout such as an image that includes reverse text or an image having localized background color. Therefore, an MFP or the like that comprises this foreground mask generation process section 251 can separate input image data into a foreground layer and background layer with good accuracy, and can compress the input image data using a suitable compression method. It is possible to improve the compression ratio of the input image data.

The other construction of the foreground mask generation process section 251 of Embodiment 2 is the same as the construction of the foreground mask generation process section 51 of Embodiment 1, so the same reference numbers are given to identical parts, and detailed explanations of the identical parts are omitted.

(Embodiment 3)

Figure 27:
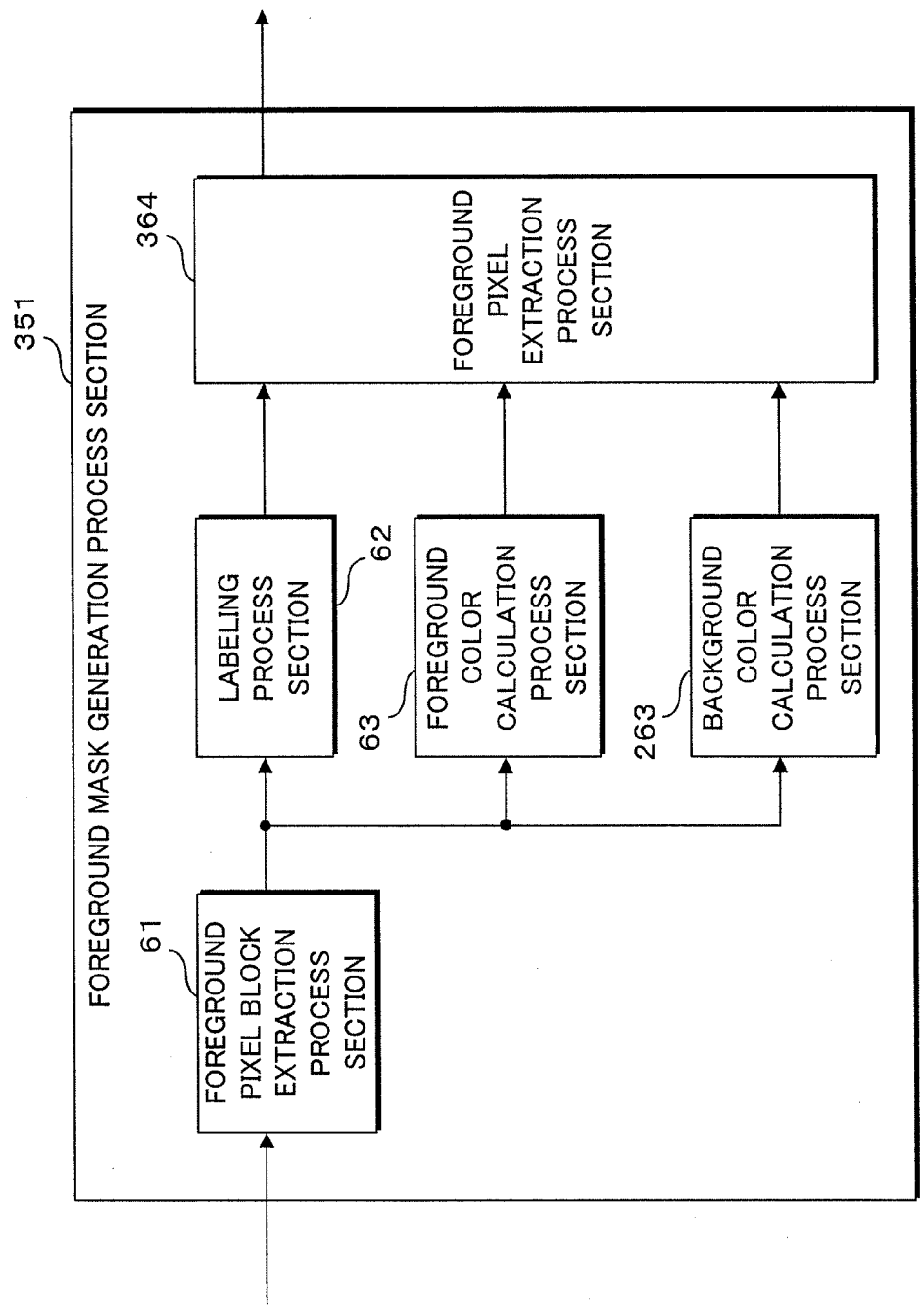
FIG. 27 is a block diagram of the construction of the foreground mask generation section of Embodiment 3.

FIG. 27 is a block diagram of the construction of a foreground mask generation process section 351 of Embodiment 3. The foreground mask generation process section 351 of Embodiment 3 comprises the foreground color calculation process section 63 as comprised by the foreground mask generation process section 51 of Embodiment 1, and the background color calculation process section 263 as comprised by the foreground mask generation process section 251 of Embodiment 2. The foreground pixel block extraction process section 61 of the foreground mask generation process section 351 divides an image area related to input image data into a plurality of pixel blocks, and classifies each of the pixel blocks into uniform density pixel blocks or foreground pixel blocks. The foreground pixel block extraction process section 61 of the foreground mask generation process section 351 extracts foreground pixel blocks. Moreover, the labeling process section 62, by giving the same label to a plurality of adjacent foreground pixel blocks, extracts areas of continuous foreground pixel blocks as foreground pixel areas.

The foreground color calculation process section 63 calculates the foreground colors of each of the foreground pixel blocks extracted by the foreground pixel block extraction process section 61, and outputs the calculated foreground colors to the foreground pixel extraction process section 364. The background color calculation process section 263 calculates the background color of each of the foreground pixel blocks extracted by the foreground pixel block extraction process section 61, and outputs the calculated background color to the foreground pixel extraction process section 364.

The foreground pixel extraction process section 364 calculates representative colors for the foreground colors calculated by the foreground color calculation process section 63 and representative colors for the background colors calculated by the background color calculation process section 263 for each foreground pixel area extracted by the labeling process section 62. The foreground pixel extraction process section 364 extracts pixels, which have pixels values within a predetermined range with respect to the representative colors of the foreground colors and whose differences of the pixel values with respect to the representative colors of the background colors exceed threshold values, as foreground pixels.

The foreground mask generation process section 351 having the construction as described above, calculates foreground colors and background colors of foreground pixel blocks extracted from input image data, and extracts foreground pixels. The foreground mask generation process section 351 can extract foreground pixels with even better accuracy.

The other construction of the foreground mask generation process section 351 of Embodiment 3 is the same as the construction of the foreground mask generation process section 251 of Embodiment 2, so the same reference numbers are given to identical parts, and detailed explanations of the identical parts are omitted.

As this description may be embodied in several forms without departing from the spirit of essential characteristics thereof, the present embodiments are therefore illustrative and not restrictive, since the scope is defined by the appended claims rather than by the description preceding them, and all changes that fall within metes and bounds of the claims, or equivalent of such metes and bounds thereof are therefore intended to be embraced by the claims.

What is claimed is:

1. An image processing apparatus that extracts foreground pixels of a foreground image from input image data, comprising:
    a classifying section that divides an image area related to the input image data into a plurality of image areas, and classifies the plurality of image areas into uniform density areas and variable density areas that are areas other than the uniform density areas, in each of the uniform density areas the difference between pixel values of pixels included therein being less than a predetermined value;
    a continuous variable density area extraction section that extracts continuous variable density areas, where variable density areas exist adjacent with each other, from the variable density areas of the variable density areas classified by said classifying section;
    a color information calculation section that calculates color information of the variable density areas; and
    a foreground pixel extraction section that extracts foreground pixels for each of the continuous variable density areas extracted by said continuous variable density area extraction section according to the color information calculated by said color information calculation section, wherein
    said color information calculation section calculates a foreground color of each of the variable density areas as color information, and calculates pixel values from among pixel values of a plurality of pixels included in each of the variable density areas, whose difference with pixel values of pixels included in uniform density areas surrounding each of the variable density areas is greater than a predetermined value, as the foreground color; and
    said foreground pixel extraction section extracts pixels, whose difference in color with the foreground color is within a predetermined range, as the foreground pixels.

2. The image processing apparatus according to claim 1, wherein
    said classifying section includes an adjacent number calculation section that calculates the number of adjacent image areas in which the difference in pixel values is less than a predetermined value; and
    said classifying section classifies image areas for which the number of adjacent image areas calculated by said adjacent number calculation section exceeds a predetermined value as the uniform density areas.

3. The image processing apparatus according to claim 2, wherein
    said adjacent number calculation section calculates from among image areas, whose difference between pixel values is less than a predetermined value and that are adjacent image areas, the number of image areas whose difference between average pixel values is within a predetermined value.

4. The image processing apparatus according to claim 1, wherein
    said classifying section
    performs, for each image area of a predetermined size, a classifying of whether the image area is one of the uniform density areas or is one of the variable density areas;
    divides each of image areas classified as the variable density areas into a size that is smaller than the predetermined size; and
    repeats the process of performing the classifying for each divided image area until the size of the image area is a predetermined size.

5. An image processing apparatus that extracts foreground pixels of a foreground image from input image data, comprising:
    a classifying section that divides an image area related to the input image data into a plurality of image areas, and classifies the plurality of image areas into uniform density areas and variable density areas that are areas other than the uniform density areas, in each of the uniform density areas the difference between pixel values of pixels included therein being less than a predetermined value;
    a continuous variable density area extraction section that extracts continuous variable density areas, where variable density areas exist adjacent with each other, from the variable density areas of the variable density areas classified by said classifying section;
    a color information calculation section that calculates color information of the variable density areas; and
    a foreground pixel extraction section that extracts foreground pixels for each of the continuous variable density areas extracted by said continuous variable density area extraction section according to the color information calculated by said color information calculation section, wherein
    said color information calculation section calculates a background color of each of the variable density areas as the color information, and calculates a color of the uniform density areas surrounding each of the variable density areas as the background color thereof; and
    said foreground pixel extraction section extracts pixels, whose difference between the color thereof and the background color is beyond a predetermined range, as the foreground pixels.

6. The image processing apparatus according to claim 5, wherein
    said classifying section includes an adjacent number calculation section that calculates the number of adjacent image areas in which the difference in pixel values is less than a predetermined value; and
    said classifying section classifies image areas for which the number of adjacent image areas calculated by said adjacent number calculation section exceeds a predetermined value as the uniform density areas.

7. The image processing apparatus according to claim 6, wherein
said adjacent number calculation section calculates from among image areas, whose difference between pixel values is less than a predetermined value and that are adjacent image areas, the number of image areas whose difference between average pixel values is within a predetermined value.

8. The image processing apparatus according to claim 5, wherein
said classifying section
performs, for each image area of a predetermined size, a classifying of whether the image area is one of the uniform density areas or is one of the variable density areas;
divides each of image areas classified as the variable density areas into a size that is smaller than the predetermined size; and
repeats the process of performing the classifying for each divided image area until the size of the image area is a predetermined size.

9. A non-transitory recording medium, on which a computer program for extracting foreground pixels of a foreground image from input image data is recorded in the form of readable format with computer, the computer program comprising steps of causing a computer:
to divide an image area related to the input image data into a plurality of image areas;
to classify the plurality of image areas into uniform density areas and variable density areas that are areas other than the uniform density areas, in each of the uniform density areas the difference between pixel values of pixels included therein being less than a predetermined value;
to extract continuous variable density areas, where variable density areas exist adjacent with each other, from the classified variable density areas;
to calculate color information of the variable density areas; and
to extract foreground pixels for each of the extracted continuous variable density areas according to the calculated color information,
wherein the step of causing a computer to calculate the color information includes steps of causing a computer:
to calculate a foreground color of each of the variable density areas as color information; and
to calculate pixel values from among pixel values of a plurality of pixels included in each of the variable density areas, whose difference with pixel values of pixels included in uniform density areas surrounding each of the variable density areas is greater than a predetermined value, as the foreground color,
wherein the step of causing a computer to extract the foreground pixels includes a step of causing a computer
to extract pixels, whose difference in color with the foreground color is within a predetermined range, as the foreground pixels.

10. A non-transitory recording medium, on which a computer program for extracting foreground pixels of a foreground image from input image data is recorded in the form of readable format with computer, the computer program comprising steps of causing a computer:
to divide an image area related to the input image data into a plurality of image areas;
to classify the plurality of image areas into uniform density areas and variable density areas that are areas other than the uniform density areas, in each of the uniform density areas the difference between pixel values of pixels included therein being less than a predetermined value;
to extract continuous variable density areas, where variable density areas exist adjacent with each other, from the classified variable density areas;
to calculate color information of the variable density areas; and
to extract foreground pixels for each of the extracted continuous variable density areas according to the calculated color information,
wherein the steps of causing a computer to calculate the color information includes steps of causing a computer:
to calculate a background color of each of the variable density areas as the color information; and
to calculate a color of the uniform density areas surrounding each of the variable density areas as the background color thereof,
wherein the step of causing a computer to extract the foreground pixels includes a step of causing a computer
to extract pixels, whose difference between the color thereof and the background color is beyond a predetermined range, as the foreground pixels.

* * * * *